US008027987B2

(12) United States Patent
Yoshida et al.

(10) Patent No.: US 8,027,987 B2
(45) Date of Patent: *Sep. 27, 2011

(54) ELECTRONIC DEVICE HAVING A HANDWRITING INPUT FUNCTION, AND NON-TRANSITORY MEDIUM STORING A CONTROL PROGRAM THEREFOR

(75) Inventors: Kohei Yoshida, Fussa (JP); Takatoshi Abe, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 297 days.

This patent is subject to a terminal disclaimer.

(21) Appl. No.: 12/330,736

(22) Filed: Dec. 9, 2008

(65) Prior Publication Data
US 2009/0157755 A1  Jun. 18, 2009

(30) Foreign Application Priority Data
Dec. 14, 2007  (JP) .................................. 2007-323874

(51) Int. Cl.
*G06F 17/30* (2006.01)
(52) U.S. Cl. .......................................... 707/758; 704/10
(58) Field of Classification Search .............. 704/10; 707/758, 999.003, 999.107
See application file for complete search history.

(56) References Cited

U.S. PATENT DOCUMENTS

| | | | | |
|---|---|---|---|---|
| 5,389,745 A | * | 2/1995 | Sakamoto | 178/18.03 |
| 5,764,794 A | * | 6/1998 | Perlin | 382/186 |
| 5,940,532 A | * | 8/1999 | Tanaka | 382/185 |
| 7,096,425 B1 | * | 8/2006 | Takahashi | 715/222 |
| 7,103,848 B2 | * | 9/2006 | Barsness et al. | 715/776 |
| 7,350,704 B2 | * | 4/2008 | Barsness et al. | 235/435 |
| 2007/0288243 A1 | | 12/2007 | Takahashi et al. | |

FOREIGN PATENT DOCUMENTS

| | | |
|---|---|---|
| JP | 6-44308 A | 2/1994 |
| JP | 10-254340 A | 9/1998 |
| JP | 2000-31666 A | 1/2000 |
| JP | 2006-31666 A | 1/2000 |
| JP | 2002-007420 A | 1/2002 |
| JP | 2004-151840 A | 5/2004 |

(Continued)

OTHER PUBLICATIONS

Japanese Office Action dated Nov. 17, 2009 (3 pages), and English translation thereof (3 pages), issued in counterpart Japanese Application Serial No. 2007-323874.

(Continued)

*Primary Examiner* — Leslie Wong
(74) *Attorney, Agent, or Firm* — Holtz, Holtz, Goodman & Chick, PC

(57) ABSTRACT

In a state where the entry word "account" retrieved from a dictionary and its explanatory information have been displayed, when the entry memo "Test point to notice" is input in handwritten characters at a handwriting input unit, the entry memo is caused to correspond to the retrieved entry word "account" and then registered. When the desired entry memo "Test point to notice" is selected from a list of the registered entry memos, the entry word "account" caused to correspond to the entry memo and its explanatory information are displayed immediately. Accordingly, as with a paper dictionary, an entry memo in which handwritten characters have been written as needed is related to the desired entry word and its explanatory information. Using the entry memo data as if it were a sticky note enables the desired entry word to be displayed easily and quickly.

9 Claims, 19 Drawing Sheets

FOREIGN PATENT DOCUMENTS

| | | |
|---|---|---|
| JP | 2006-162972 A | 6/2006 |
| JP | 2007-241711 A | 9/2007 |
| JP | 2007-282660 A | 11/2007 |
| KR | 10-2006-0005482 A | 1/2006 |

OTHER PUBLICATIONS

Korean Office Action dated Apr. 16, 2010 and English translation thereof in counterpart Korean Application No. 10-2008-0127131.

Japanese Office Action dated May 11, 2010 and English translation thereof, issued in counterpart Japanese Application No. 2007-323874.

Hiroshi Takahashi, "Hanako 9 no subete" (translation: Everything about Hanako 9), JustSystem Corporation, Nov. 20, 1998, First Edition, pp. 254-256.

Related U.S. Appl. No. 12/331,640; First named inventor: Takatoshi Abe; Title: "Electronic Dictionary Device with a Handwriting Input Function"; filed Dec. 10, 2008.

Japanese Office Action dated Sep. 7, 2010 and English translation thereof issued in Japanese Application No. 2007-321099, which is a counterpart of related U.S. Appl. No. 12/331,640.

Japanese Office Action dated Dec. 8, 2009 and English translation thereof issued in said Japanese Application No. 2007-321099.

* cited by examiner

ELECTRONIC DEVICE HAVING A HANDWRITING INPUT FUNCTION, AND NON-TRANSITORY MEDIUM STORING A CONTROL PROGRAM THEREFOR

CROSS-REFERENCE TO RELATED APPLICATIONS

This application is based upon and claims the benefit of priority from prior Japanese Patent Application No. 2007-323874, filed Dec. 14, 2007, the entire contents of which are incorporated herein by reference.

BACKGROUND OF THE INVENTION

1. Field of the Invention

This invention relates to an electronic device.

2. Description of the Related Art

There has been known an electronic dictionary device that offers the functions of a paper dictionary. While having the advantage of being capable of squeezing data of many dictionaries into a small package, as well as many other advantages, the electronic dictionary device is less convenient to use than a paper dictionary.

With a paper dictionary, when you open the dictionary to a page on which, for example, an entry word to be referred to and its explanatory information have been printed, you can easily grasp the place where a suitable word meaning and examples to be referred to are written. However, with the electronic dictionary device, since the limitation of the display area prevents all of the retrieved entry word and its explanatory explanation from being surveyed at a glance, it is difficult to easily grasp the description parts of a suitable word meaning and examples to be referred to.

To overcome this problem, one of the conventional electronic dictionary devices has realized the function of enabling the user to obtain a quick glance at the dictionary by displaying not only a word meaning list corresponding to an entry word surrounded with a frame in a part of the display screen but also explanatory information corresponding to the word meaning specified in the word meaning list in another part of the screen. One of such electronic dictionary devices has been disclosed in, for example, Jpn. Pat. Appln. KOKAI Publication No. 2007-241711.

However, in the conventional electronic dictionary device, characters cannot be written by hand as needed in a place where a desired entry word and its explanatory information appear in such a manner that the former are related to the latter, or the place where a desired entry word appears cannot be found out from the contents written on a sticky note as with the paper dictionary.

BRIEF SUMMARY OF THE INVENTION

It is an object of the invention to provide an electronic device capable of storing a handwritten character in such a manner that the character is related to an arbitrary entry word, and easily retrieving the related entry word on the basis of the handwritten character.

The foregoing object is accomplished by providing an electronic device comprising: a dictionary data storage means which stores a plurality of entry words and explanatory information on each of said plurality of entry words in such a manner that the former correspond to the latter in a one-to-one correspondence; a dictionary information display control means which causes an arbitrary entry word and explanatory information corresponding to the entry word stored in the dictionary data storage means to be displayed on a display unit according to a user operation; a handwriting input accepting means which accepts a handwriting input corresponding to a user operation with a handwriting input unit in a state where the dictionary information display control means has displayed an arbitrary entry word and explanatory information corresponding to the entry word on the display unit; an entry memo storage means which causes the handwriting input information accepted by the handwriting input accepting means to correspond to the entry word displayed by the dictionary information display control means and stores the resulting information as an entry memo; an entry memo display control means which displays in list form the entry memos stored in the entry memo storage means on the display unit; and an entry-memo corresponding entry word display control means which, on the basis of an entry word stored in the entry memo storage means in such a manner that the entry word corresponds to an entry memo selected by a user operation from the entry memos displayed in list form by the entry memo display control means, reads the entry word and its explanatory information from said plurality of entry words and their explanatory information stored by the dictionary data storage means and displays the entry word and explanatory information on the display unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
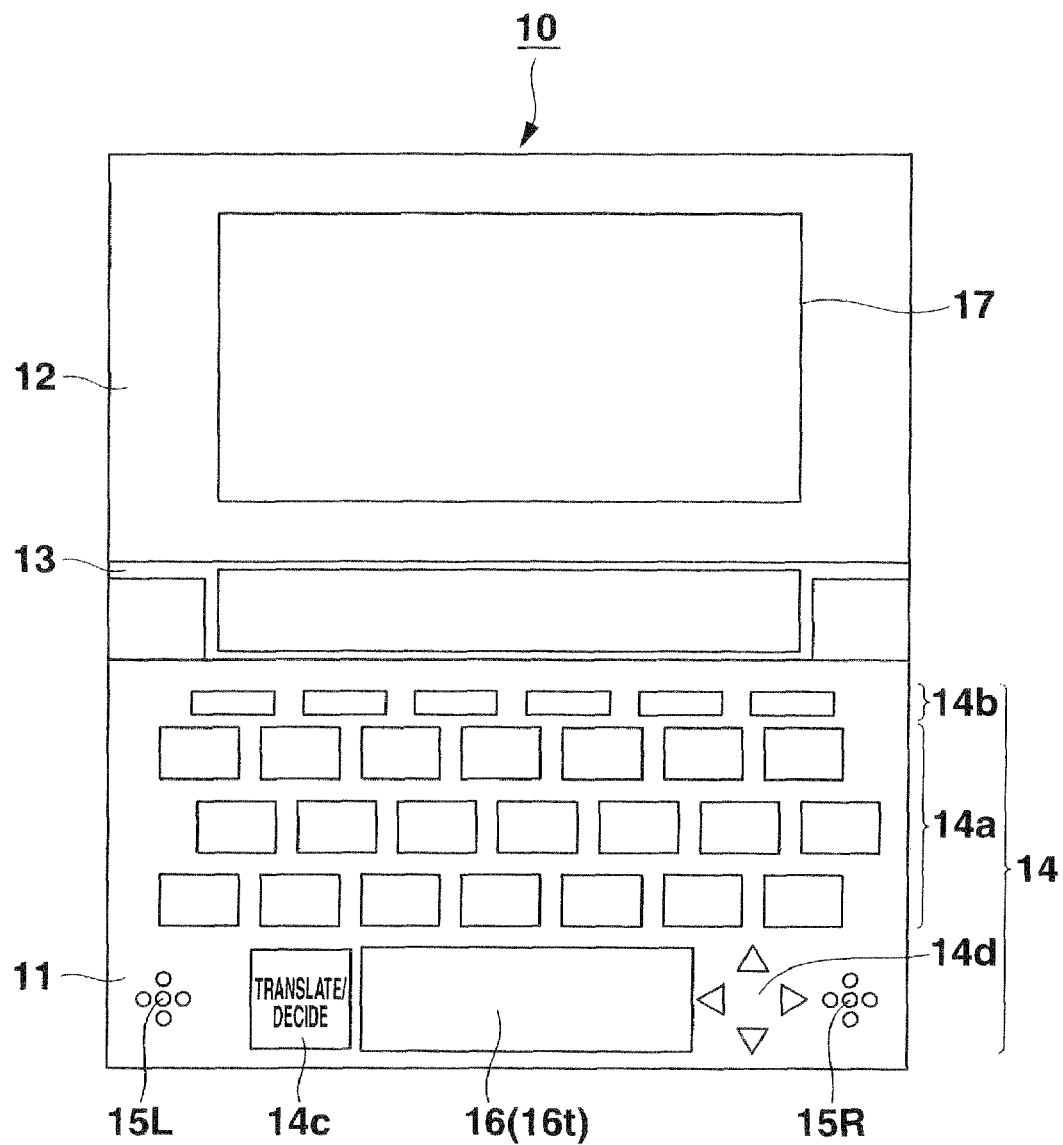
FIG. 1 is a front view showing an appearance configuration of an electronic dictionary device 10 with a handwriting input function according to a first embodiment of the invention.

Embodiments according to the present invention will be described in detail with reference to the accompanying drawings. The scope of the claimed invention shall not be limited to the examples illustrated in the drawings.

First Embodiment

FIG. 1 is a front view showing an appearance configuration of an electronic dictionary device 10 with a handwriting input function according to a first embodiment of the invention.

The electronic dictionary device 10 is composed of a body case 11, a lid case 12, and a hinge unit 13 in such a manner that the body case 12 is coupled with the lid case 12 via the hinge unit 13 so as to form a foldable case that can be opened and closed. With the foldable case opened, the body case 11 has an input unit 14 and a touch panel 16 provided on its surface. The input unit 14 includes character input keys 14a, dictionary specify keys 14b, "Translate/Decide" key 14c, cursor keys 14d, and speakers 15L, 15R.

The touch panel 16 has a structure where a touch position sensing unit which senses the position where the user touches with a pen or his or her finger is integral with a display unit. The touch panel 16 is so configured that a transparent tablet 16t is laid on a 256×64 dot liquid-crystal display screen on the front side of the central part of the input unit 14. The input area of the touch panel 16 is switched to a handwriting input unit 16a for inputting handwritten characters, a multifunction touch input unit 16b, or an area where the input units 16a, 16b are mixed, when it is necessary (see FIG. 2).

The track of the handwriting input in the area where the touch panel 16 has been switched to the handwriting input unit 16a is mirrored by the liquid-crystal display screen and displayed there.

At the surface of the lid case 12, for example, a 480×320 dot liquid-crystal display unit 17 with backlighting is provided to cover almost the entire surface.

Figure 2:
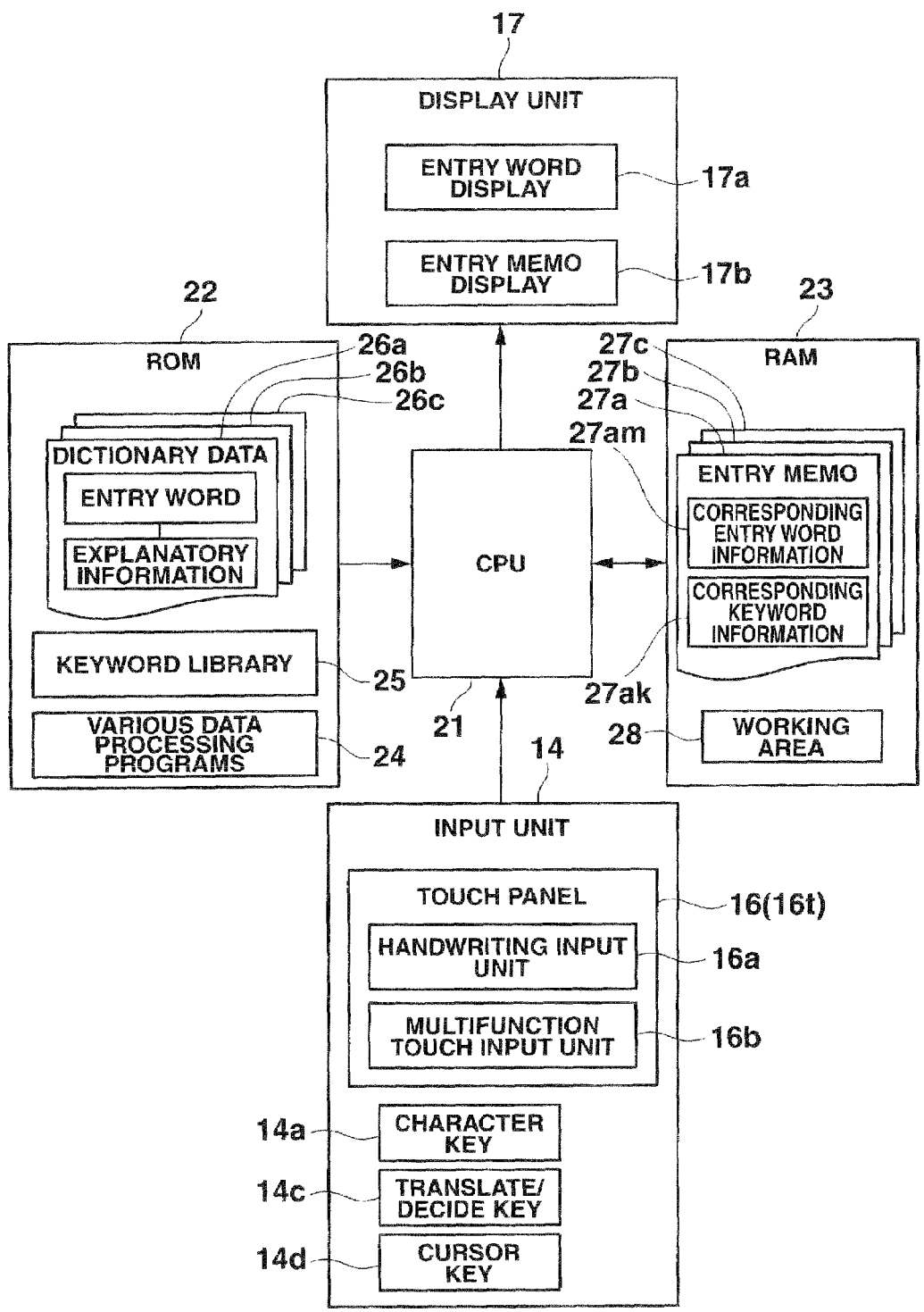
FIG. 2 is a block diagram of the electronic circuitry of the electronic dictionary device 10 with the handwriting input function of the first embodiment.

FIG. 2 is a block diagram of the electronic circuitry of the electronic dictionary device 10 with the handwriting input function.

The electronic dictionary device 10 is composed of a computer which reads programs recorded in various types of storage mediums or transferred programs and whose operation is controlled by the read-in programs. The electronic circuitry of the electronic dictionary device is composed of a CPU (central processing unit) 21.

The CPU 21 controls each section of the circuitry using a RAM 23 as a working memory according to a device control program previously stored in a ROM (flash memory) 22.

The device control program stored in the ROM 22 is activated by an input signal corresponding to a user operation on the input unit 14 or touch panel 16.

Connected to the CPU 21 are not only the input unit 14, touch panel 16, ROM 22, and RAM 23 but also the display unit 17 and the like.

Stored in the ROM 22 are not only a system program that supervises the entire operation of the electronic dictionary device 10 but also various data processing programs 24.

The various data processing programs 24 include an entry word retrieving program according to the input of a search string, a readout displaying program for various pieces of explanatory information including translated words, semantic contents, and example sentences corresponding to a specified entry word, an entry memo registering program for creating entry memo data items 27a, 27b, . . . according to the input of handwritten characters on the touch panel 16 in a state where explanatory information corresponding to the entry word is displayed and registering the data items in such a manner that they correspond to the entry word, and an entry memo calling program for displaying the entry word and its explanatory information caused to correspond to the entry memo from the entry memo data items 27a, 27b, . . . registered in the entry memo registering process.

In the ROM 22, various dictionary data items 26a, 26b, 26c, . . . and a keyword library 25 are stored.

The various dictionary data items 26a, 26b, 26c, . . . include not only a Japanese-language dictionary, an English-Japanese dictionary, a Japanese-English dictionary, an English-English dictionary, an English thesaurus, and the like but also different types of dictionary data items, such as "KOJI" and "KANGEN". They are previously or additionally input and stored.

In the keyboard library 25, for example, the words and phrases included in the various dictionary data items 26a, 26b, 26c, . . . are stored as keyword data items.

In the RAM 23, entry memo data items 27a, 27b, 27c, . . . registered in the entry memo registering process are stored. Moreover, a working area 28 that stores various data items input to or output from the CPU 21 as needed according to the various data processes (24) is secured in the RAM 23.

When handwritten character data items are input as the entry memo data items 27a, 27b, 27c, . . . , the entry words displayed on the display unit 17 are added as corresponding entry word information items 27am, 27bm, 27cm, . . . to the entry memo data items 27a, 27b, 27c, . . . and the resulting data items are stored.

In a third embodiment of the invention, described later, written character data is character-recognized as the entry memo data items 27a, 27b, 27c, . . . . The character-recognized character data is compared with the keyword data stored in the keyword library 25 to determine whether they coincide with each other, thereby extracting keyword data. The extracted keyword data is further added to the entry memo data items 27a, 27b, 27c, . . . , thereby producing corresponding keyword information items 27ak, 27bk, 27ck, . . . , which are then stored.

The liquid-crystal display unit 17 provides a list display 17a of entry words retrieved from the dictionary data items 26a, 26b, 26c, . . . in the entry word retrieving process or a list display 17b of entry memo data items 27a, 27b, 27c read from the RAM 23 in the entry memo calling process.

Next, the operation of the electronic dictionary device 10 with the handwriting input function configured as described above will be explained.

Figure 3:
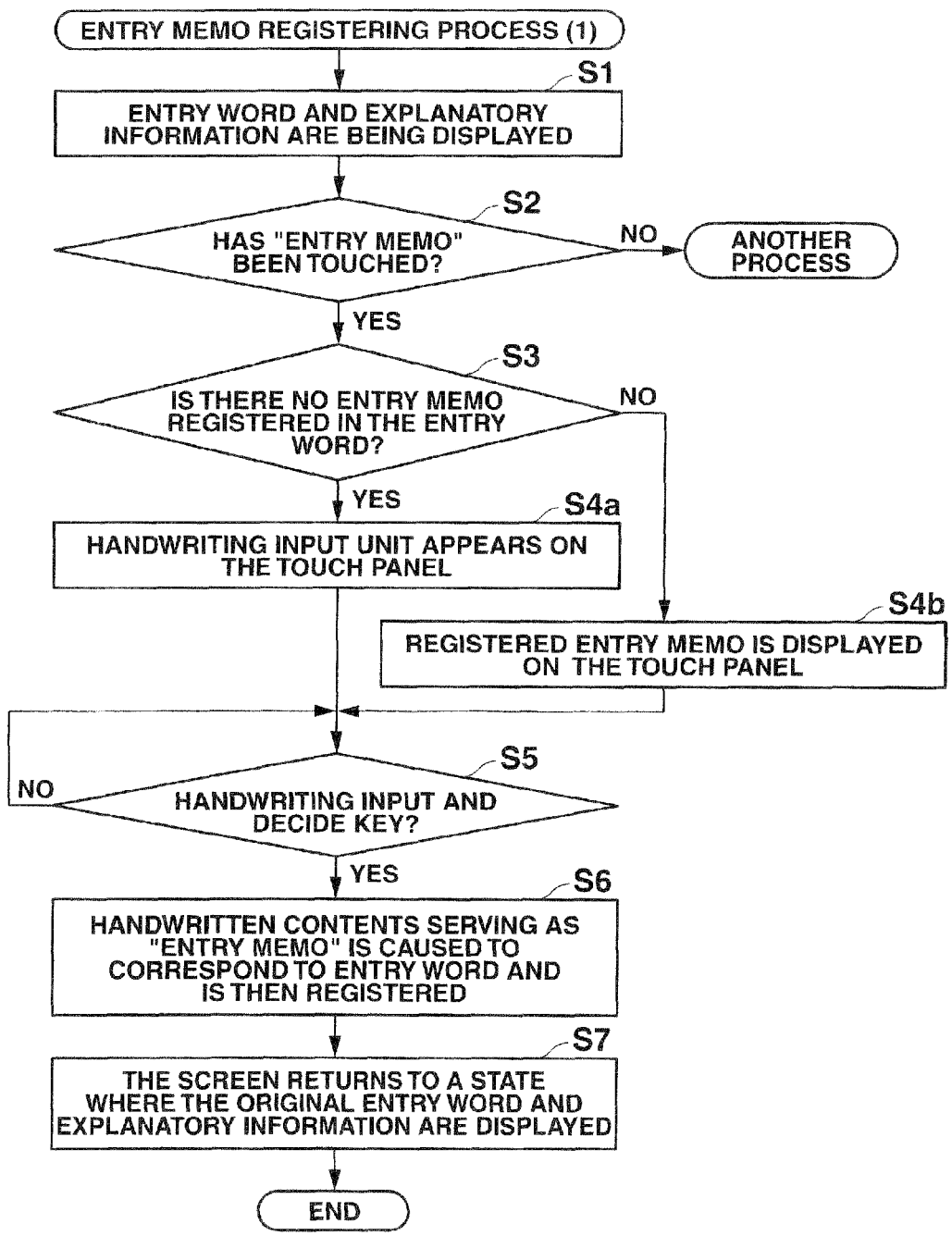
FIG. 3 is a flowchart to help explain an entry memo registering process of the first embodiment in the electronic dictionary device 10 with the handwriting input function.

FIG. 3 is a flowchart to help explain an entry memo registering process of the first embodiment in the electronic dictionary device 10 with the handwriting input function.

FIGS. 4A to 4E show display operation 1 to display operation 5 according to a user operation in the entry memo registering process of the first embodiment in the electronic dictionary device 10 with the handwriting input function.

Figure 4A:
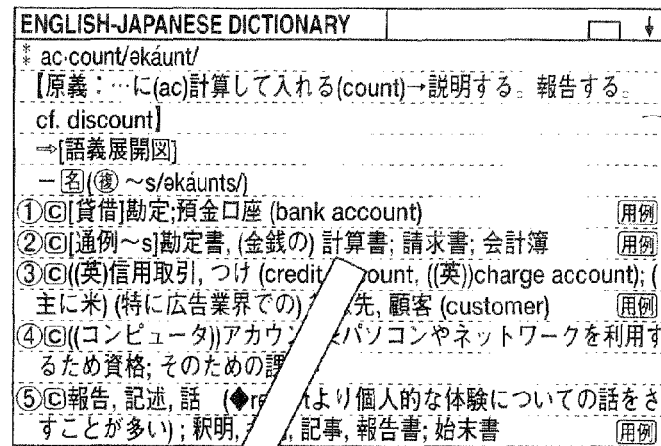
FIGS. 4A to 4E show display operation 1 to display operation 5 according to a user operation in the entry memo registering process of the first embodiment in the electronic dictionary device 10 with the handwriting input function.
Figure 4A:
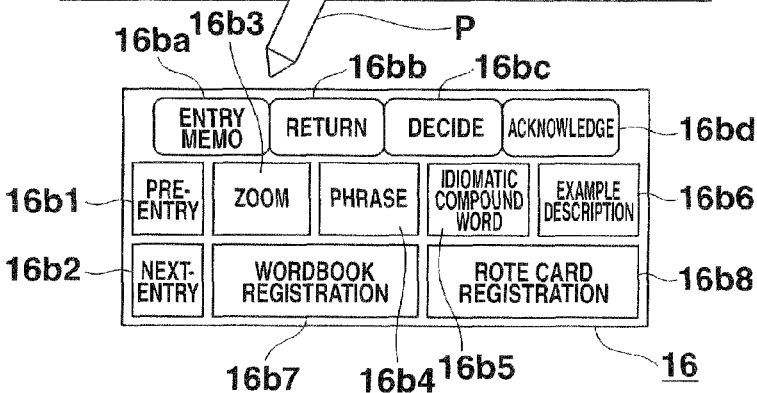

When an arbitrary entry word (e.g., "account") is retrieved from the dictionary data items 26a, 26b, . . . in an ordinary entry word retrieving process and "Translate/Decide" key 14c is input, explanatory information corresponding to the specified entry word "account" is read out in the explanatory information read and display process and is then displayed on the liquid-crystal display unit 17 as an explanatory information display screen G as shown in FIG. 4A (step S1).

With the explanatory information display screen G being displayed, the following buttons are displayed as the multifunction touch input unit 16b on the touch panel 16: "Entry Memo" button 16ba, "Return" button 16bb, "Decide" key 16bc, "Acknowledge" key 16bd, "Pre-entry" button 16b1, "Next-entry" button 16b2, "Zoom" button 16b3, "Phrase" button 16b4, "Idiomatic Compound Word" button 16b5, "Example Description" button 16b6, "Wordbook Registration" button 16b7, "Rote Card Creation" button 16b8.

With the explanatory information display screen G corresponding to the user-specified entry word "account" being displayed, when "Entry Memo" button 16a displayed on the touch panel 16 is touched and input with a pen P to create and register an entry memo caused to correspond to the entry word "account" (YES in step S2), it is determined whether entry memory data item 27a having the entry word "account" as corresponding entry word information item 27am has been registered in the RAM 23 (step S3).

Figure 4B:
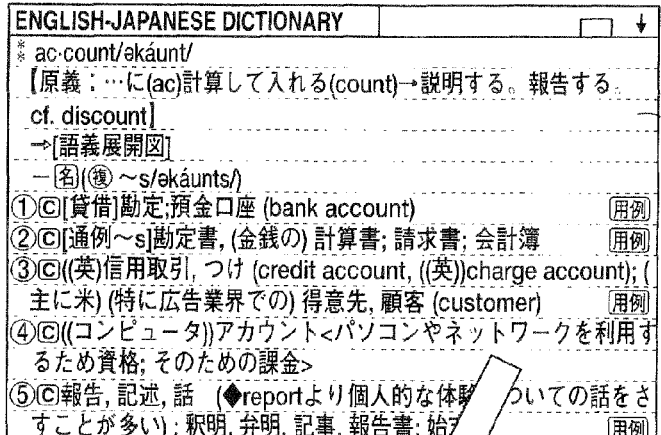
Figure 4B:
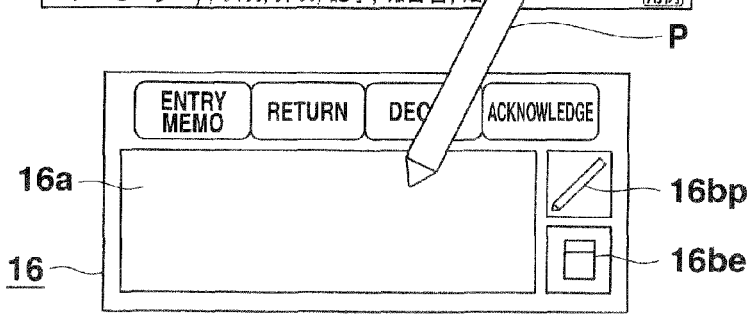

If it has been determined that entry memo data item 27a having the entry word "account" as the corresponding entry word information item 27am has not been registered (YES in step S3), the handwriting input unit 16a is set on the touch panel 16 as shown in FIG. 4B and "Pen" button 16bp and "Eraser" button 16be are displayed in a part of the right end of the touch panel (step S4a). A handwritten character can be input to the handwriting input unit 16a by touching "Pen" button 16bp. The handwritten character input to the handwriting input unit 16a can be erased by touching "Erase" button 16be.

In step S3, if it has been determined that entry memo data item 27a having the entry word "account" as the corresponding entry word information item 27am has been registered (NO in step S3), the handwriting input unit 16a is set on the touch panel 16 and the registered entry memo data item 27a is displayed on the handwriting input unit 16a (step S4b).

Figure 4C:
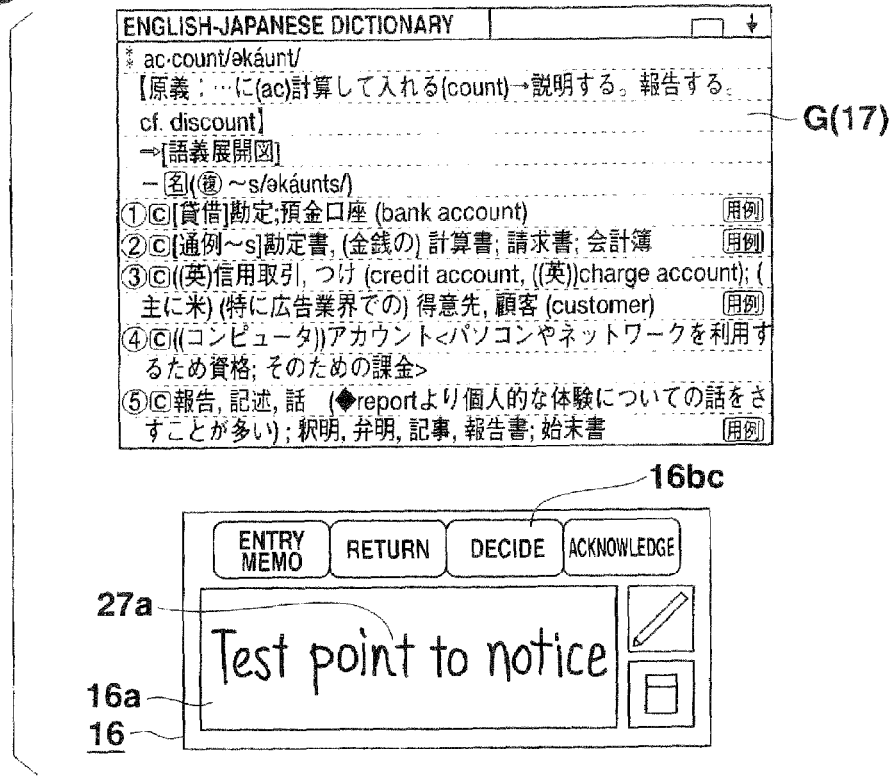
Figure 4D:
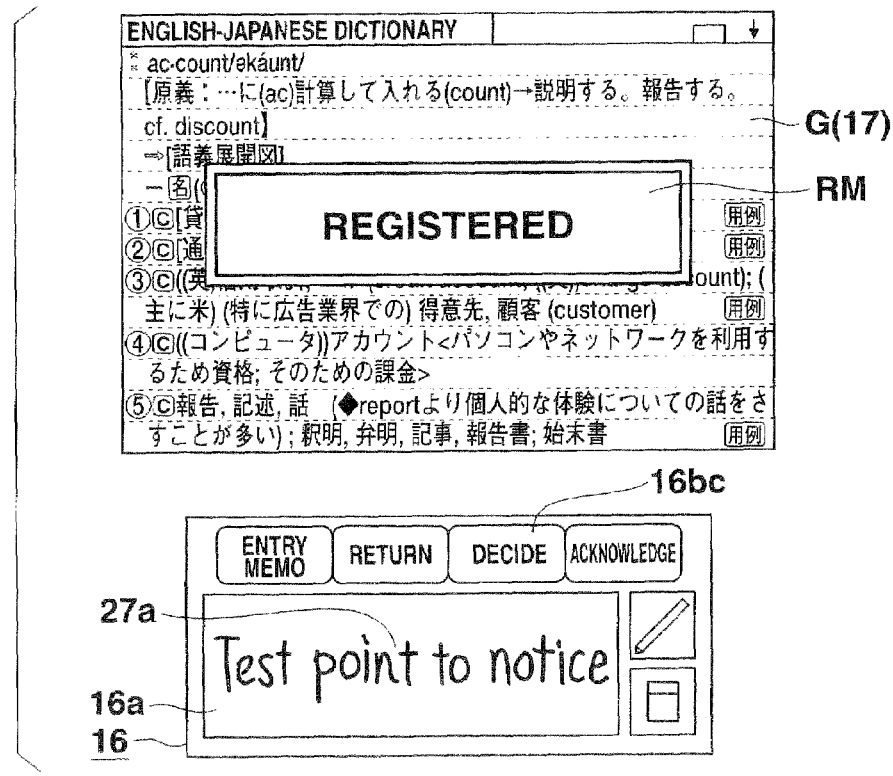

Then, as shown in FIG. 4C, when a handwritten character (e.g., "Test point to notice") desired by the user is input and displayed as an entry memo (27a) at the handwriting input unit 16a and "Translate/Decide" key 14c is input (YES in step S5), the input handwritten character data "Test point to notice" is taken as entry memo data item 27a and then caused to correspond to corresponding entry word information item 27am for the entry word "account" as shown in FIG. 4D. The resulting data item is registered in the RAM 23 (step S6).

In this case, on the explanatory information display screen G corresponding to the entry word "account," the registration completion message "Registered" RM is displayed, thereby informing the user that the registration of the entry memo data item "Test point to notice" 27a having corresponding entry word information item 27am for the entry word "account" has been completed.

Figure 4E:
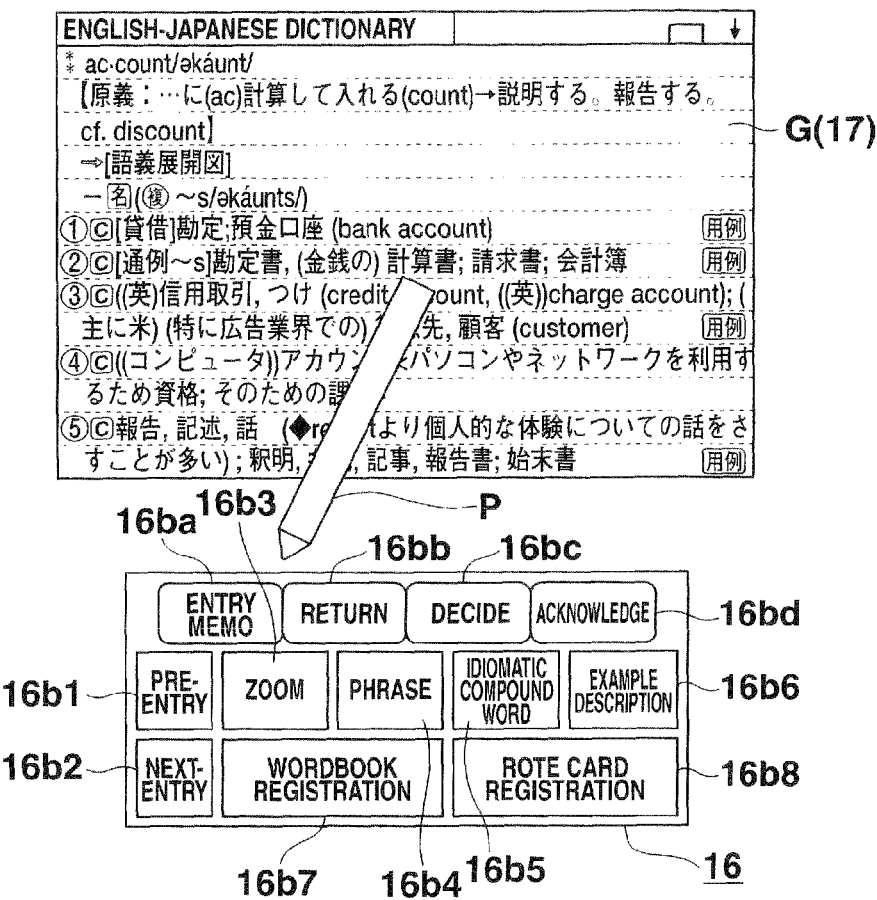

Then, after a certain period of time (e.g., after one second), the screen returns to a state where the original explanatory information display screen G is displayed on the liquid-crystal display unit 17 as shown FIG. 4E (step S7).

The series of entry memo registering processes (step S1 to step S7) are carried out repeatedly, thereby creating sequentially entry memo information items 27a, 27b, 27c, . . . caused to correspond to the corresponding entry word information items 27am, 27bm, 27cm, . . . for the user-desired entry word. The entry memo information items 27a, 27b, 27c, . . . are then registered in the RAM 23.

Figure 5:
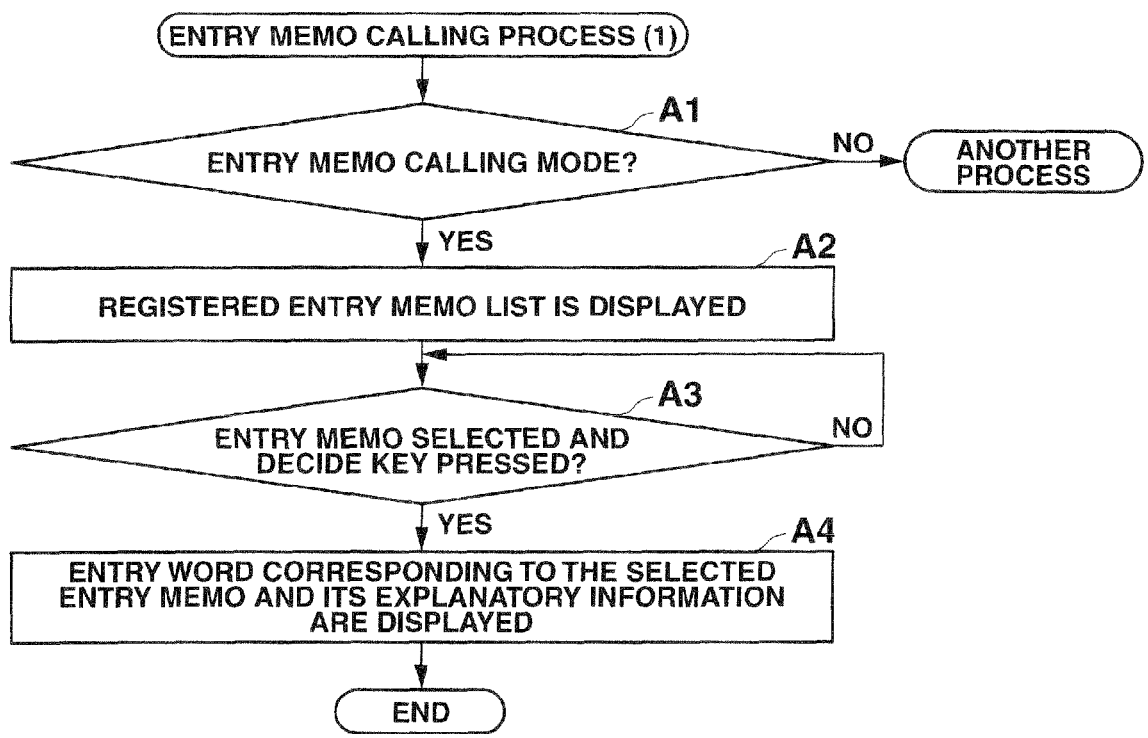
FIG. 5 is a flowchart to help explain an entry memo calling process of the first embodiment in the electronic dictionary device 10 with the handwriting input function.

FIG. 5 is a flowchart to help explain an entry memo calling process of the first embodiment in the electronic dictionary device 10 with the handwriting input function.

Figure 6A:
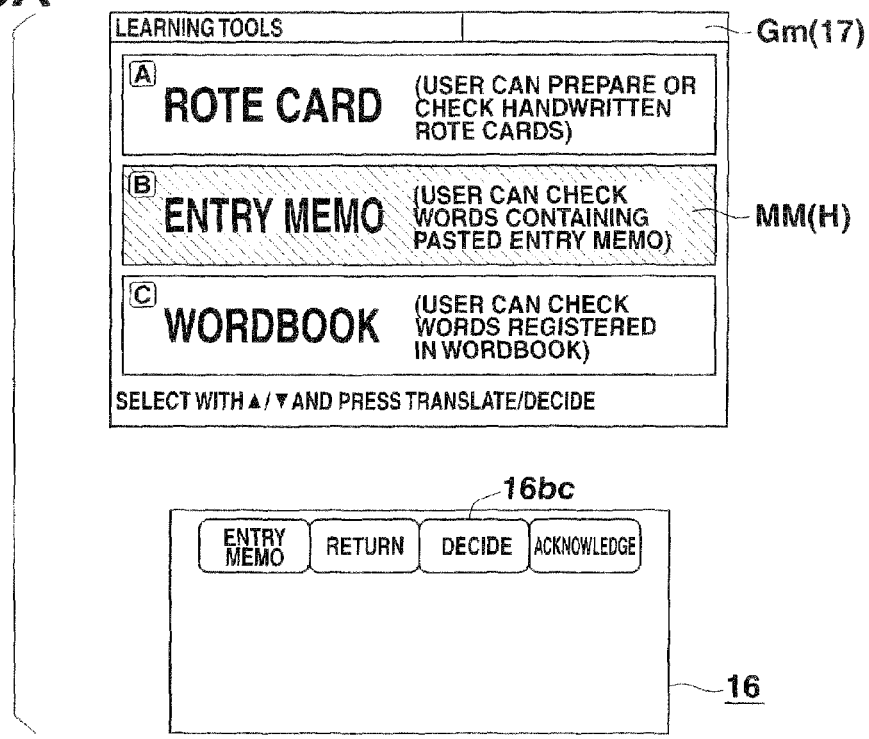
FIGS. 6A to 6C show display operation 1 to display operation 3 according to a user operation in the entry memo calling process of the first embodiment in the electronic dictionary device 10 with the handwriting input function.
Figure 6B:
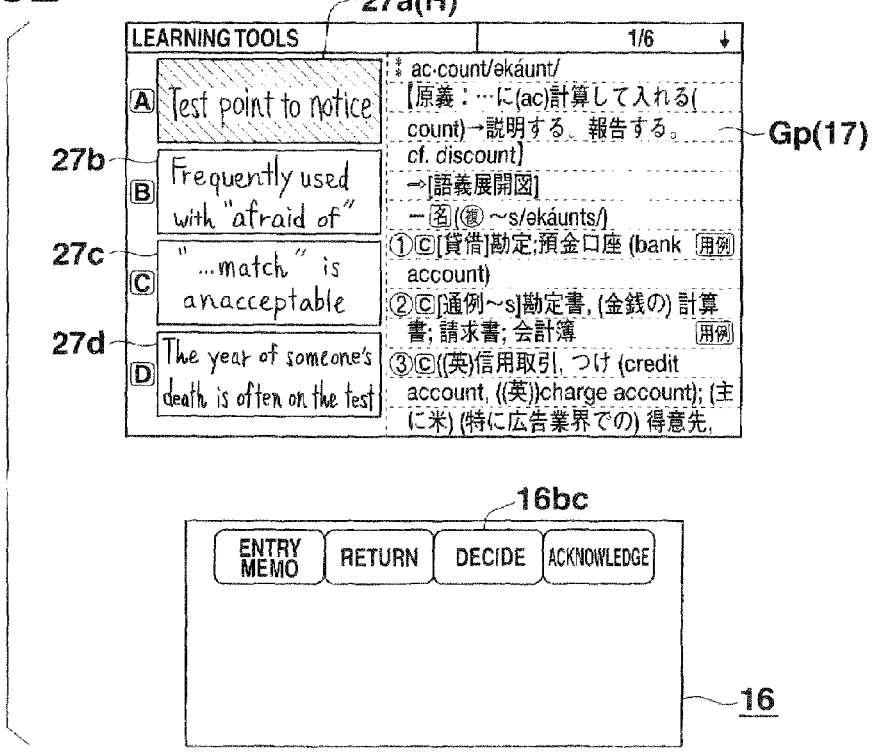
Figure 6C:
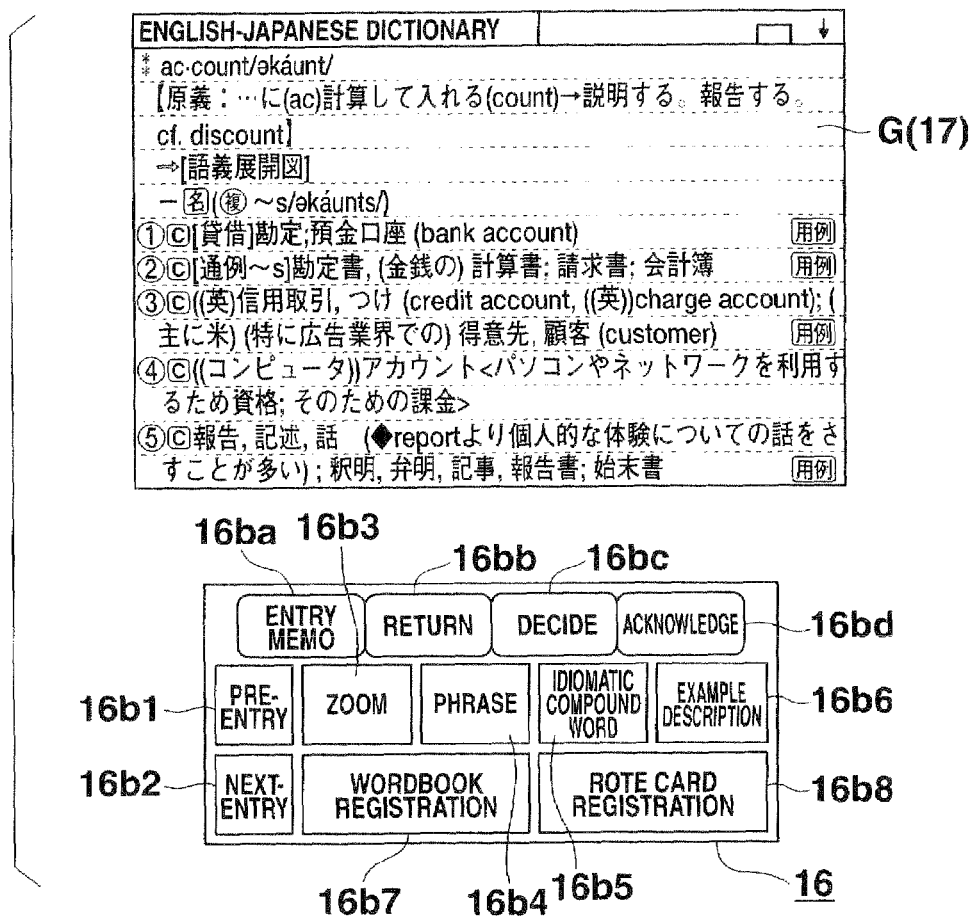

FIGS. 6A to 6C show display operation 1 to display operation 3 according to a user operation in the entry memo calling process of the first embodiment in the electronic dictionary device 10 with the handwriting input function.

According to the user operation, a learning function menu screen Gm is displayed on the display unit 17 as shown in FIG. 6A. In a state where "Entry Memo" MM on the menu screen Gm is selected according to the input of the cursor key 14d and shown in a highlighted manner H, when an entry memo calling mode is set by the input of "Translate/Decide" key 14c (YES in step A1), entry memo data items 27a, 27b, 27c, . . . registered in the RAM 23 are read and displayed in list form on the display unit 17 as shown in FIG. 6B (step A2).

In this case, the entry memo data items 27a, 27b, 27c, . . . displayed in list form on the display unit 17 can be shown in a highlighted manner H according to the input of the cursor key 14d and then selected. The entry word caused to correspond to the selected entry memo data item 27a and its explanatory information are displayed on an explanatory information preview screen Gp.

Here, when the user-desired entry memo data item "Test point to notice" 27a is selected from the entry memo data items 27a, 27b, 27c, . . . displayed in list form and "Translate/Decide" key 14c is input (YES in step A3), explanatory information corresponding to the entry word "account" is read from the dictionary data items 26a, 26b, . . . according to the corresponding entry word information item 27am caused to correspond to the selected entry memo data item "Test point to notice" 27a and is then displayed full-screen as the explanatory information display screen G on the display unit (step A4).

By carrying out the series of entry memo calling processes, the entry word corresponding to the contents and its explanatory information can be read out easily from, for example, handwritten character entry memo data item 27a that is similar to a sticky note.

Accordingly, with the entry memo registering and calling function of the first embodiment in the electronic dictionary device 10 with the handwriting input function, when the handwritten-character entry memo data item "Test point to notice" 27a is input at the handwriting input unit 16a in a state where the entry word "account" retrieved from the dictionary and its explanatory information have been displayed, the entry memo data item 27a is caused to correspond to the retrieved entry word "account" and then registered. Then, when the desired entry memo data item "Test point to notice" 27a is selected from the list of the registered entry memo data items 27a, 27b, . . . , the entry word "account" caused to correspond to the entry memo data item 27a and its explanatory information are displayed immediately. This makes it possible to relate entry memo data item 27a in which characters have been written by hand as needed to the desired entry word and its explanatory information and use the entry memo data item 27a as if it were a sticky note, thereby enabling the desired entry word to be displayed easily and quickly, as with the paper dictionary.

In the entry memo registering and calling function of the first embodiment, the entry memo data items 27a, 27b, 27c, . . . are caused to correspond to the corresponding entry word information items 27am, 27bm, 27cm, . . . in a one-to-one correspondence and then registered. In contrast, as will be explained in the entry memo registering and calling function according to a second embodiment of the invention, each of the entry memo data items 27a, 27b, 27c, . . . may be caused to correspond to a plurality of corresponding entry word information items: entry memo data item 27a is caused to correspond to corresponding index information items 27am1 to 27amn, entry memo data item 27b is caused to correspond to corresponding index information items 27bm1 to 27bmn, entry memo data item 27c is caused to correspond to corresponding index information items 27cm1 to 27cmn, . . . .

Second Embodiment

In a second embodiment of the invention, entry memo data item 27a is first created in an entry memo registering process in a state where an entry word retrieved from a dictionary and its explanatory information display screen G have been displayed as in the first embodiment, and the entry memo data item 27a is caused to correspond to the corresponding entry word information item 27am1 for the entry word and is then registered. Then, in a subsequent entry memo calling process, corresponding entry word information item 27am2 for a desired entry word newly retrieved from the dictionary is additionally caused to correspond to the entry memo data item 27a selectively displayed according to a user operation and is then registered. This causes a plurality of corresponding entry word information items 27am1, 27am2, . . . to be registered for one entry memo data item 27a.

Accordingly, the entry memo registering process of the second embodiment is the same as the entry memo registering process of the first embodiment (see FIG. 3).

Figure 7:
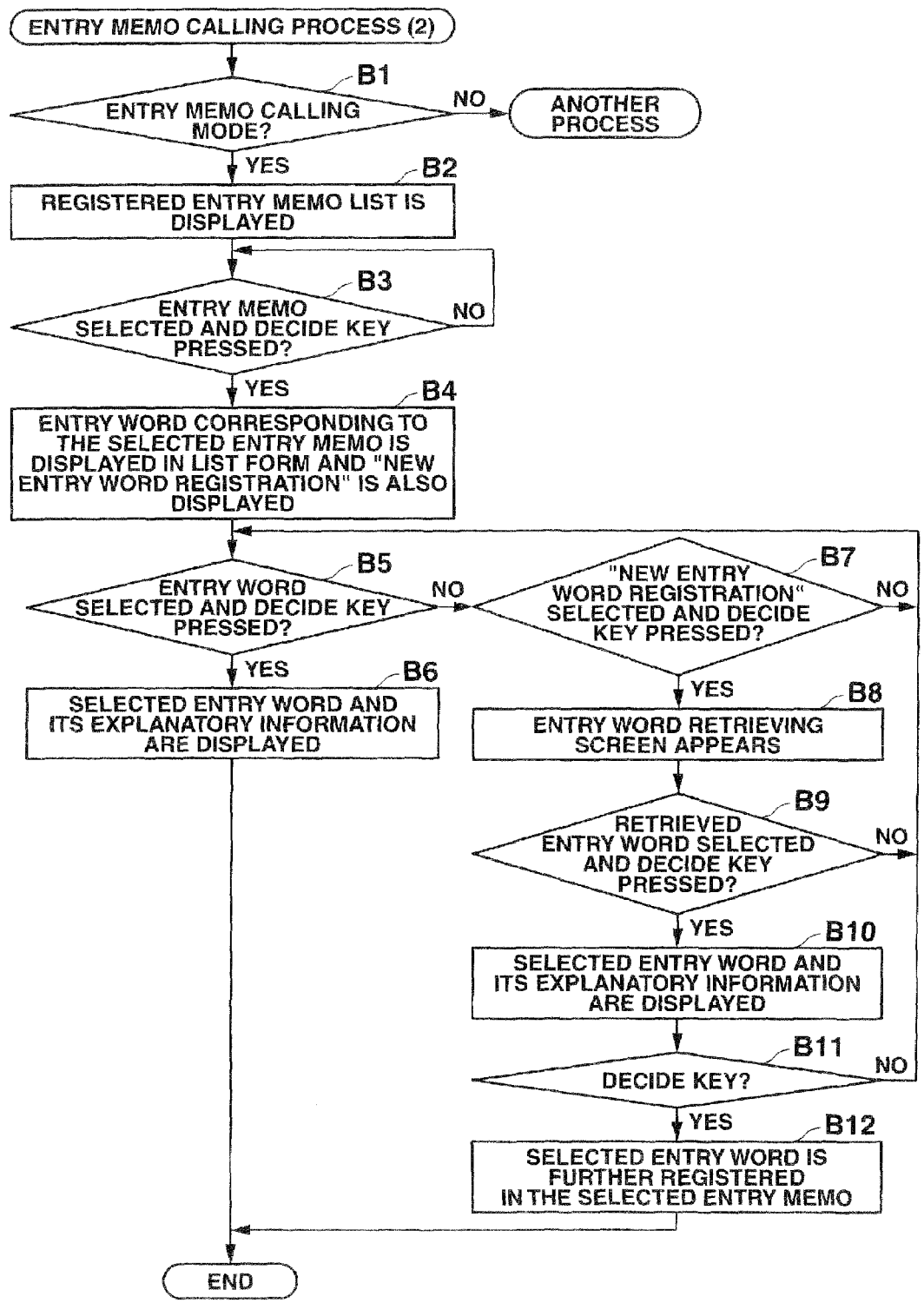
FIG. 7 is a flowchart to help explain an entry memo calling process according to a second embodiment of the invention in the electronic dictionary device 10 with the handwriting input function.

FIG. 7 is a flowchart to help explain an entry memo calling process of the second embodiment in the electronic dictionary device 10 with the handwriting input function.

FIGS. 8A to 8D show display operation 1 to display operation 4 according to a user operation in the entry memo calling process of the second embodiment in the electronic dictionary device 10 with the handwriting input function.

Figure 8A:
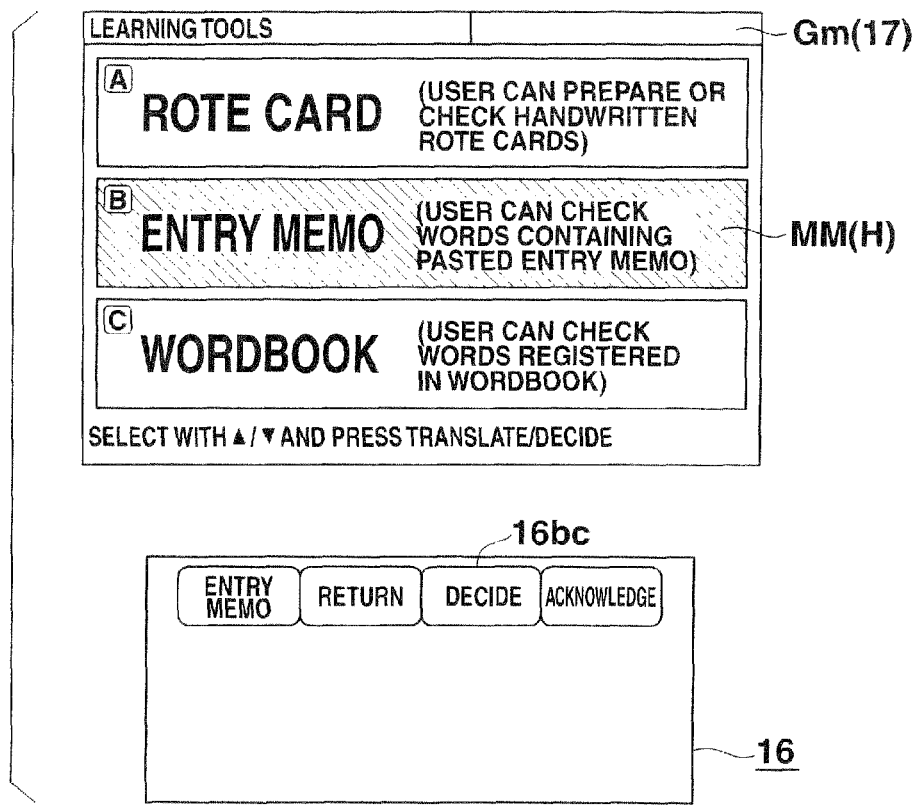
FIGS. 8A to 8D show display operation 1 to display operation 4 according to a user operation in the entry memo calling process of the second embodiment in the electronic dictionary device 10 with the handwriting input function.
Figure 8B:
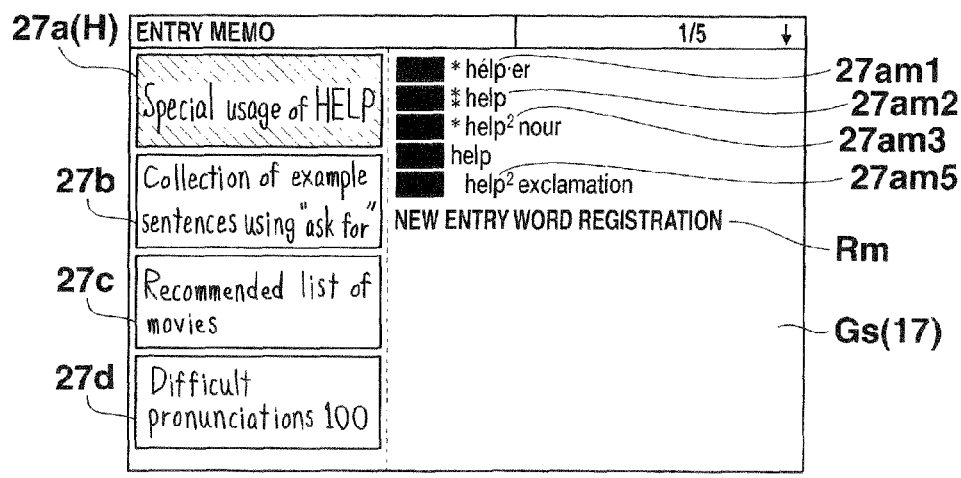

In a state where a learning function menu screen Gm is displayed on the display unit 17 and "Entry Memo" MM on the menu screen Gm is selected and shown in a highlighted manner H by the input of the cursor key 14d as shown in FIG. 8A, when the entry memo calling mode is set by the input of "Translate/Decide" key 14c (YES in step B1), the entry memo data items 27a, 27b, 27c, . . . registered in the RAM 23 are read and displayed in list form on the display unit 17 as shown in FIG. 8B (step B2).

With the registered entry memo data items 27a, 27b, 27c, . . . being displayed in list form, when the user-desired entry memo data item "Special usage of HELP" is selected and shown in a highlighted manner H by the input of the cursor key 14d and "Translate/Decide" key 14c is input (YES in step B3), the corresponding entry word information items "help• er" 27am1 to "help3" 27am5 caused to correspond to the selected entry memo data item 27a and then registered are read and displayed on the display unit 17 as a corresponding entry word list screen Gs to which the item "New Entry Word Registration" Rm has been added (step B4).

Figure 8C:
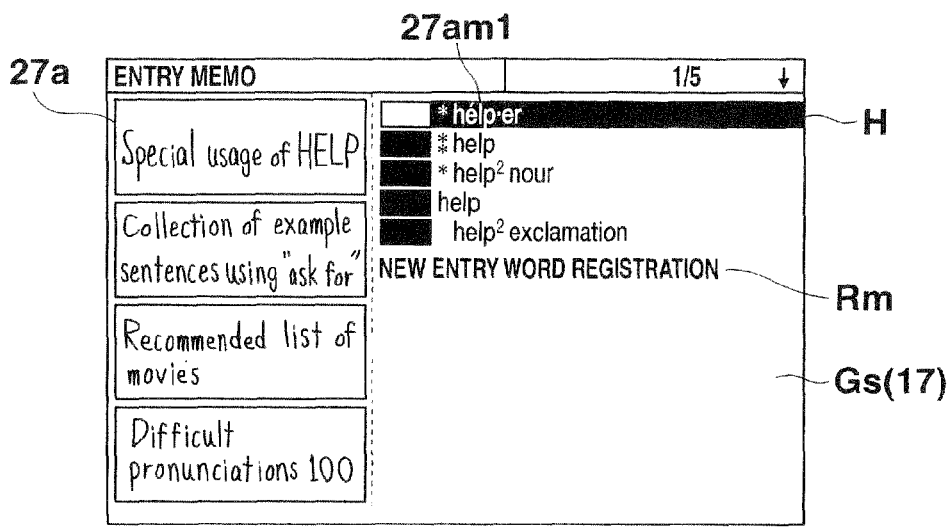
Figure 8D:
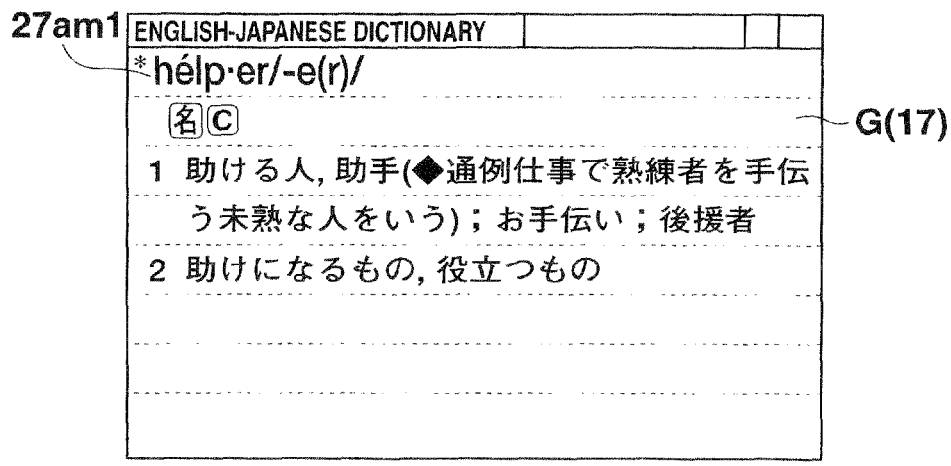

With the corresponding entry word list screen Gs for the user-desired entry memo data item 27a, one entry word "help• er" 27am1 is selected and shown in a highlighted manner H according to the input of the cursor key 14d and "Translate/Decide" key 14c is input as shown in FIG. 8C (YES in step B5), explanatory information corresponding to the selected entry word "help• er" 27am1 is read from dictionary data items 26a, 26b, . . . and displayed full-screen as an explanatory information display screen G on the display unit 17 (step B6).

On the other hand, in the processes of steps B3 and B4, when the item "New Entry word Registration" Rm is selected and shown in a highlighted manner H according to the input of the cursor key 14d and "Translate/Decide" key 14c is input on the corresponding entry word list screen Gs for entry memo data item "Special usage of HELP" displayed as shown in FIG. 8B (YES in step B7), an entry word retrieving screen is displayed in an ordinary dictionary retrieving process (step B8).

With the index retrieving screen, when a new entry word desired by the user is retrieved and displayed so that the new entry word may be caused to correspond to the entry memo data item "Special usage of HELP" 27a and "Translate/Decide" key 14c is input (YES in step B9), the retrieved entry word and its explanatory information are read from the dictionary data items 26a, 26b, 26c, . . . and displayed on the display unit 17 as the explanatory information display screen G (step B10).

When the user acknowledges the explanatory information display screen G for the new entry word and inputs "Translate/Decide" key 14c (YES in step B11), corresponding entry word information for the entry word newly retrieved and decided in steps B7 to B11 is caused to correspond to entry memo data item "Special usage of HELP" 27a selected and shown in a highlighted manner H in step B3 and is then registered in the RAM 23 (step B12).

Accordingly, with the memo registering and calling function of the second embodiment in the electronic dictionary device 10 with the handwriting input function configured as described above, when a new entry word is retrieved and displayed and "Translate/Decide" key 14c is input in a state where a desired entry memo data item 27a has been selected from the entry memo data items 27a, 27b, . . . displayed in list form in the entry memo calling process, the corresponding index information item 27amn for the new entry word is caused to correspond to the selected entry memo data item 27a and then registered. This makes it possible to cause a plurality of corresponding entry word information items 27am1, 27am2, . . . to correspond to one entry memo data item 27a, which produces not only the effect of being capable of displaying a desired entry word easily and quickly by using the entry memo data item 27a as if it were a sticky note as with the paper dictionary, but also the effect of being capable of displaying a plurality of entry words on the basis of one entry memo data item 27a (sticky note).

While in the second embodiment, a new corresponding entry word information item 27amn is added to the user-selected entry memo data item 27a and the resulting data item is registered in the entry memo calling process, a plurality of entry words may be retrieved and determined at the time of the creation of the entry memo data item 27a to be registered in the entry memo registering process, thereby causing a plurality of corresponding entry word information items 27am1, 27am2, . . . to correspond to one entry memo data item 27a and registering the resulting information items.

Third Embodiment

In a third embodiment of the invention, when entry memo data item 27*a* is created by the input of handwritten characters and a corresponding entry word information item 27*am* is caused to correspond to the entry memo data item 27*a* and the resulting data item is registered, a keyword coinciding with a word or a phrase obtained by character-recognizing the handwritten characters in the entry memo data item 27*a* is retrieved from a keyword library 25, and the retrieved keyword (corresponding keyword information item 27*ak*) is also caused to correspond to the entry memo data item 27*a* and the resulting data item is registered.

This makes it possible to search for a desired entry memo data item quickly by inputting a keyword (27*ak*) in characters even when, for example, many memo data items 27*a*, 27*b*, . . . have been registered, which enables an entry word related to the entry memo data item and its explanatory information to be looked at easily.

Figure 9:
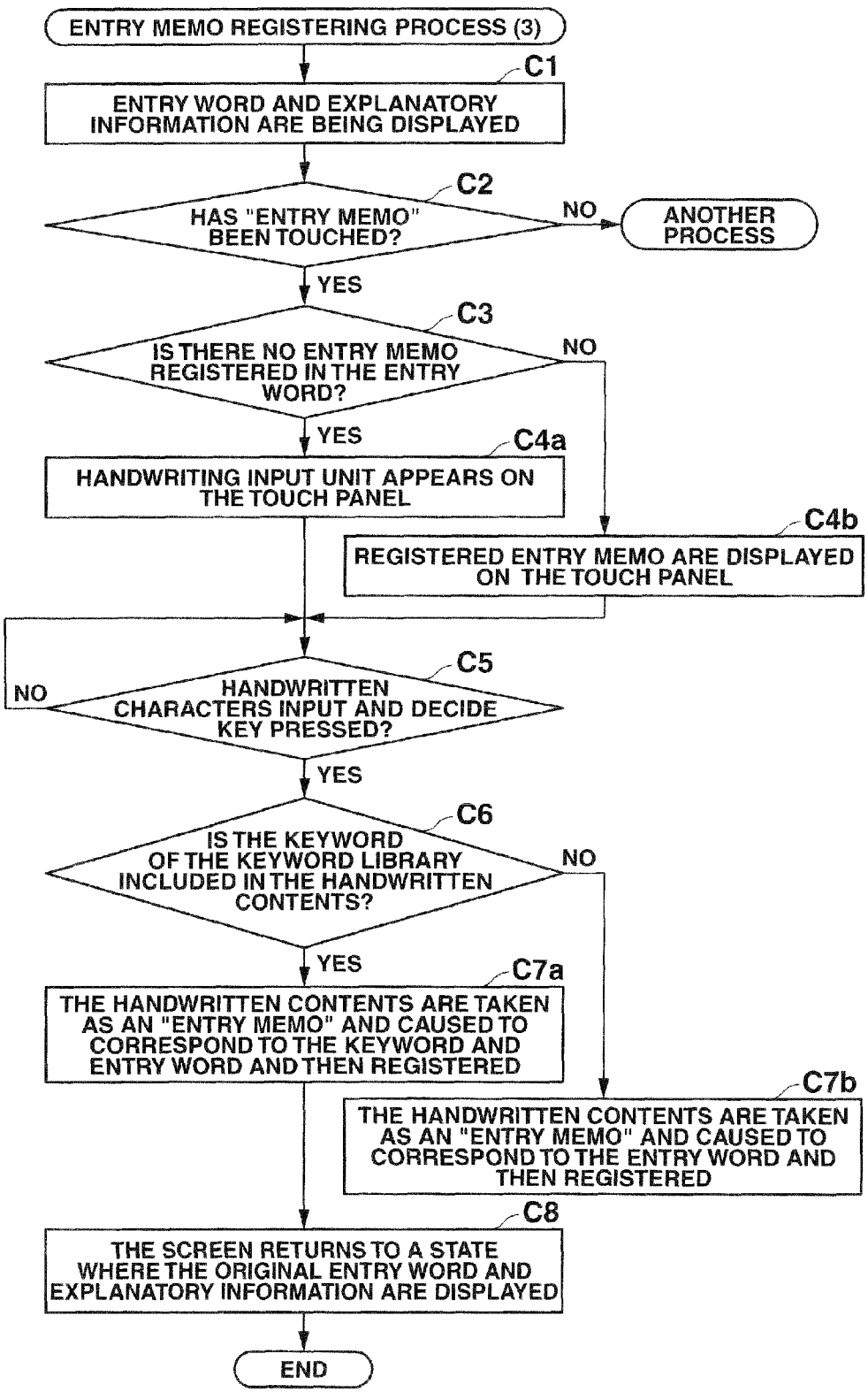
FIG. 9 is a flowchart to help explain an entry memo registering process according to a third embodiment of the invention in the electronic dictionary device 10 with the handwriting input function.

FIG. 9 is a flowchart to help explain an entry memo registering process of the third embodiment in the electronic dictionary device 10 with the handwriting input function.

FIGS. 10A to 10E show display operation 1 to display operation 5 according to a user operation in the entry memo registering process of the third embodiment in the electronic dictionary device 10 with the handwriting input function.

Since the operations in step C1 to C5→C7*b*, C8 in the entry memo registering process of the third embodiment are the same as the processes in steps S1 to S7 (see FIG. 3) of the first embodiment, a detailed explanation of them will be omitted.

Figure 10A:
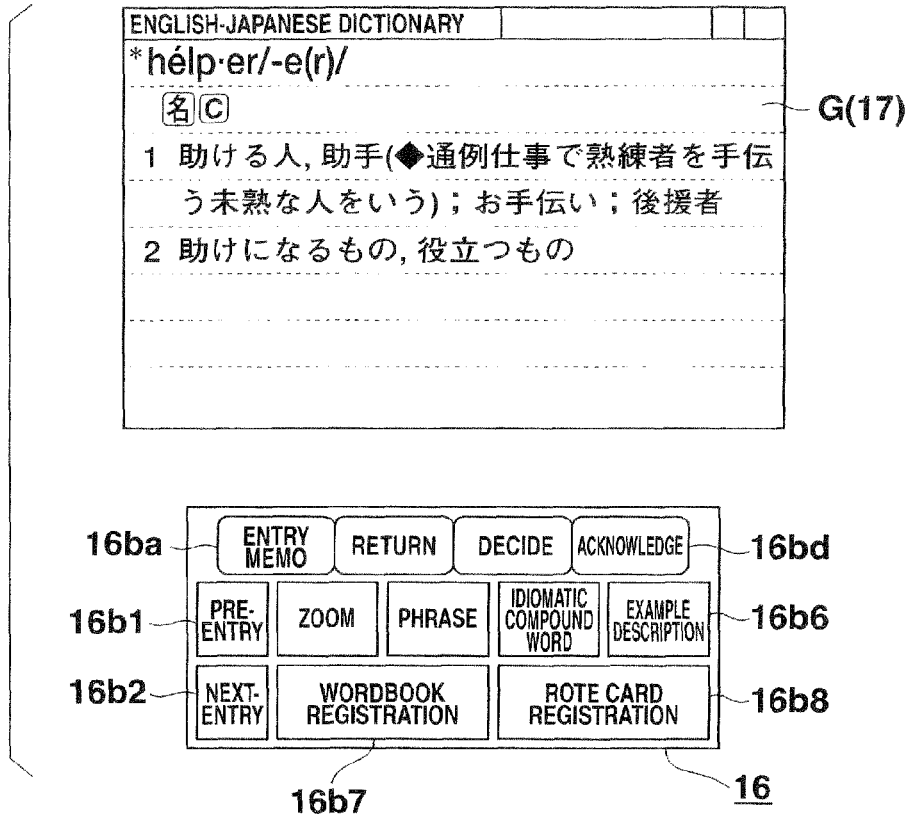
FIGS. 10A to 10E show display operation 1 to display operation 5 according to a user operation in the entry memo registering process of the third embodiment in the electronic dictionary device 10 with the handwriting input function.
Figure 10B:
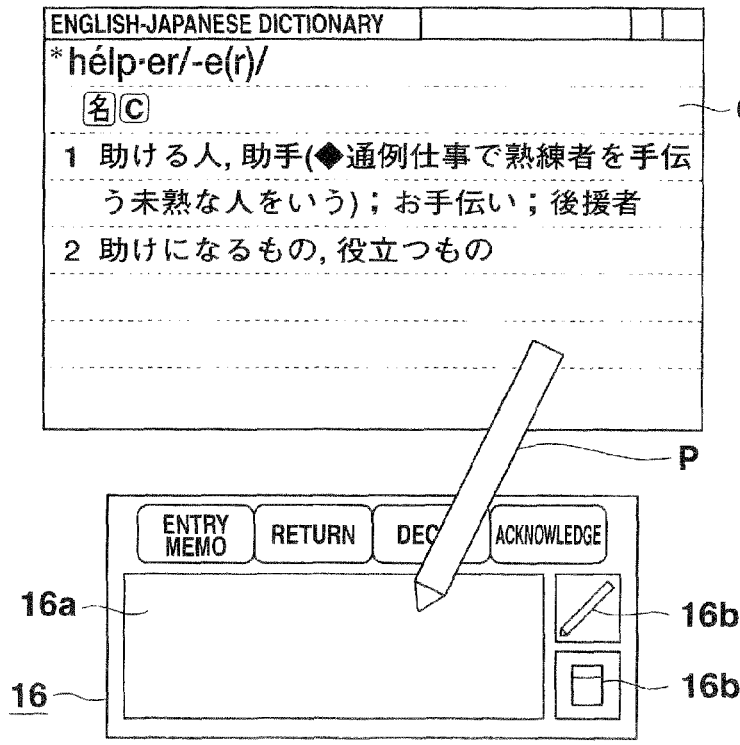
Figure 10C:
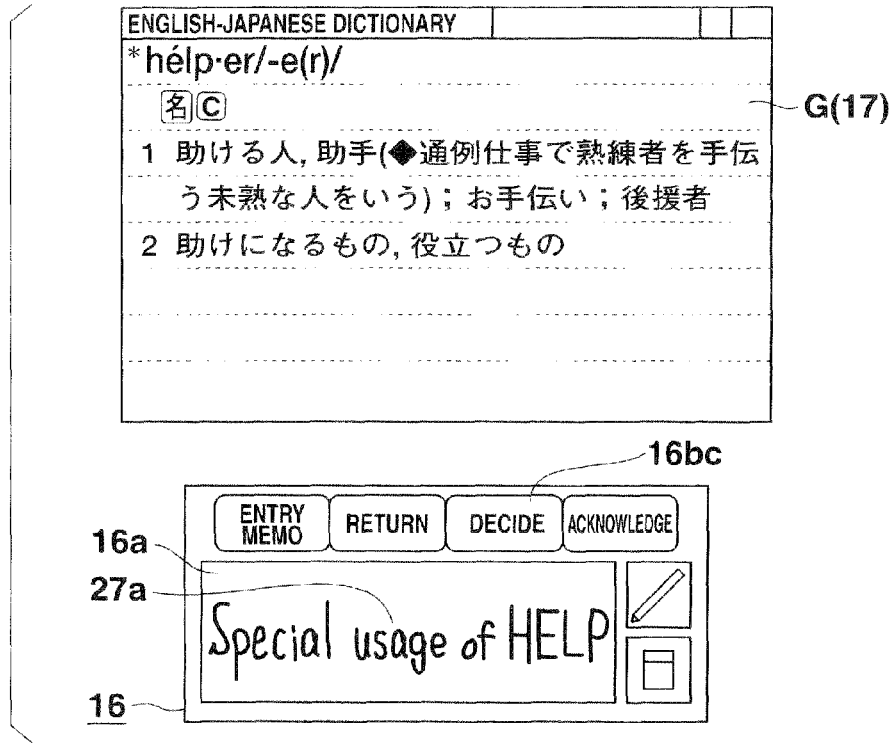
Figure 10D:
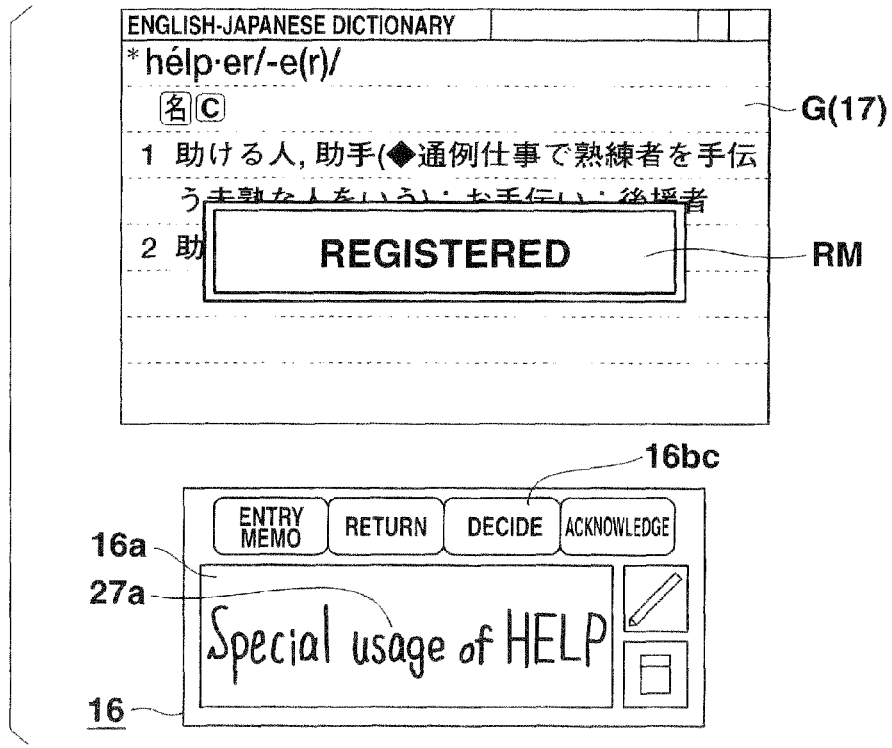
Figure 10E:
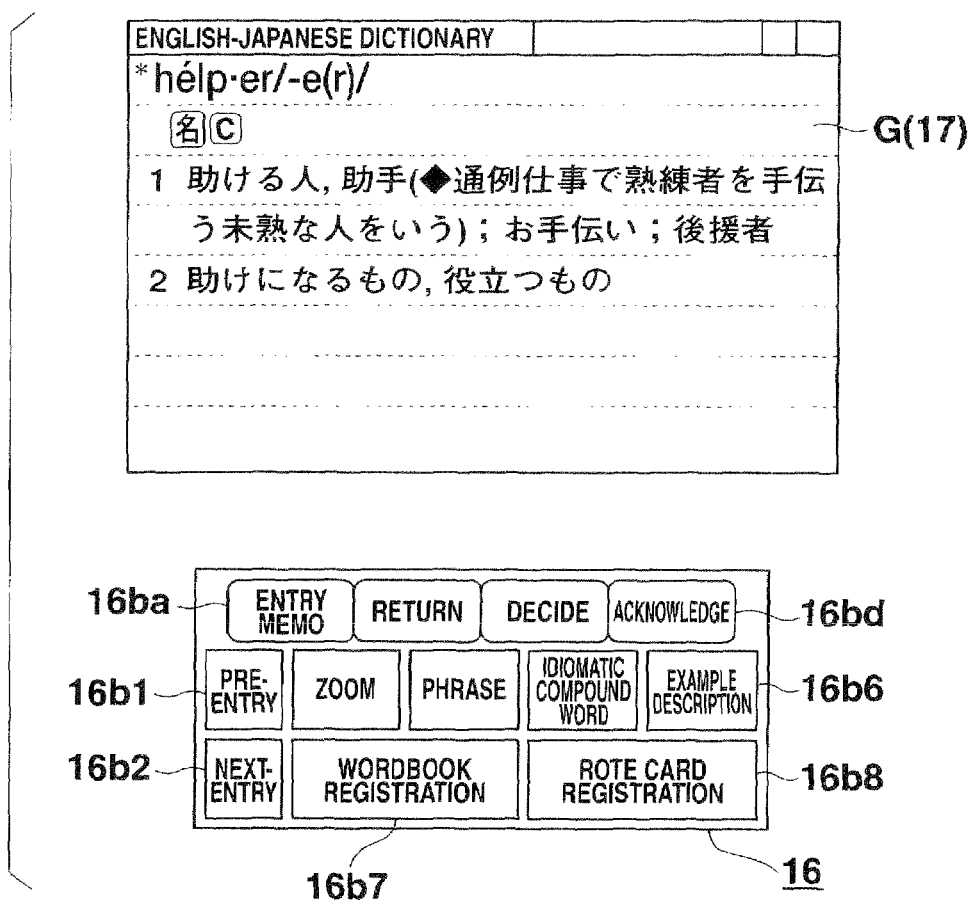

In a series of operations in steps C1 to C5→C7*b*, C8, when an "Entry Memo" mode is set (step C2) and the entry memo data item "Special usage of HELP" 27*a* is created and determined (steps C3 to C5) by the input of handwritten characters on the handwriting input unit 16*a* as shown in FIGS. 10B and 10C in a state where, for example, an explanatory information display screen G for entry word "help• er" retrieved from a dictionary has been displayed as shown in FIG. 10A (step C1), corresponding entry word information item 27*am* for the entry word "help• er" is caused to correspond to the entry memo data item "Special usage of HELP" 27*a* and the resulting data item is registered in the RAM 23 as shown in FIG. 10D (steps C6→C7*a*/C7*b*). Then, as shown in FIG. 10E, the screen is returned to a state where the explanatory information display screen G for the original entry word "help• er" is displayed (step C8).

In the entry memo registering process of the third embodiment, when the entry memo data item "Special usage of HELP" 27*a* is created by the input of handwritten characters to the handwriting input unit 16*a* and "Translate/Decide" key 14*c* is input as shown in FIGS. 10C and 10D (YES in step C5), the handwritten characters "Special usage of HELP" in the entry memo data item 27*a* are character-recognized. Then, it is determined whether the character-recognized handwritten characters "Special usage of HELP" (27*a*) include a word or a phrase coinciding with the keyword stored in the keyword library 25 (step C6).

If it has been determined that the keywords "HELP," "Special," and "Usage" in the keyword library are included in the character-recognized handwritten characters "Special usage of HELP" (27*a*) (YES in step C6), the keywords "HELP," "Special," "Usage," and the corresponding entry word information item 27*am* for the entry word "help• er" retrieved from the dictionary are caused to correspond to the handwritten character entry memo data item 27*a* and the resulting data item is registered in the RAM 23 (step C7*a*).

By carrying out the entry memo registering process (step C1 to step C8) of the third embodiment, handwritten-character entry memo data item 27*a* to which corresponding entry word information item 27*am* for the user-desired entry word is caused to correspond can be registered together with corresponding keyword information item 27*ak* for the keyword included in the handwritten characters in the RAM 23.

Figure 11:
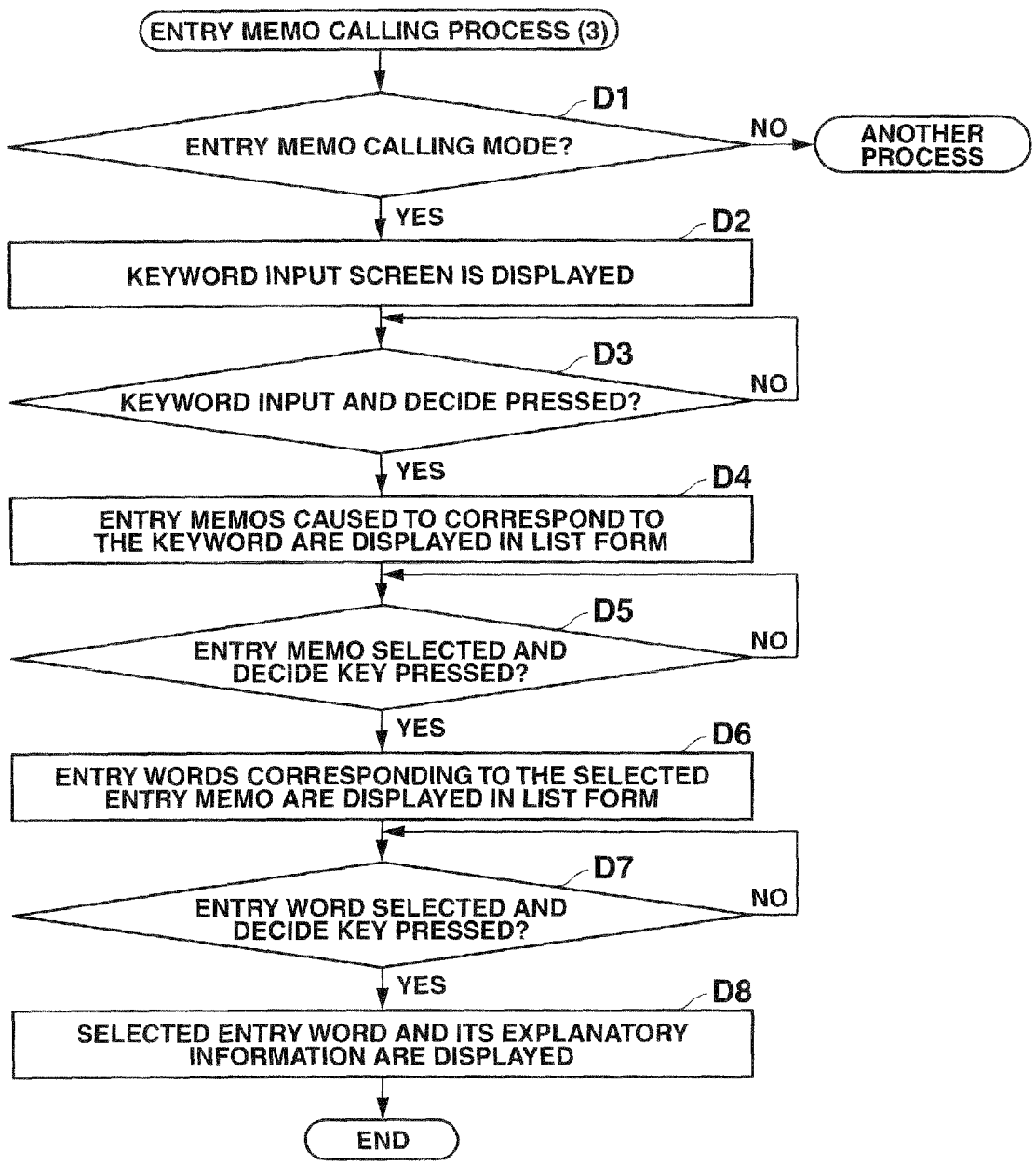
FIG. 11 is a flowchart to help explain an entry memo calling process of the third embodiment in the electronic dictionary device 10 with the handwriting input function.

FIG. 11 is a flowchart to help explain an entry memo calling process of the third embodiment in the electronic dictionary device 10 with the handwriting input function.

FIGS. 12A to 12E show display operation 1 to display operation 5 according to a user operation in the entry memo calling process of the third embodiment in the electronic dictionary device 10 with the handwriting input function.

Figure 12A:
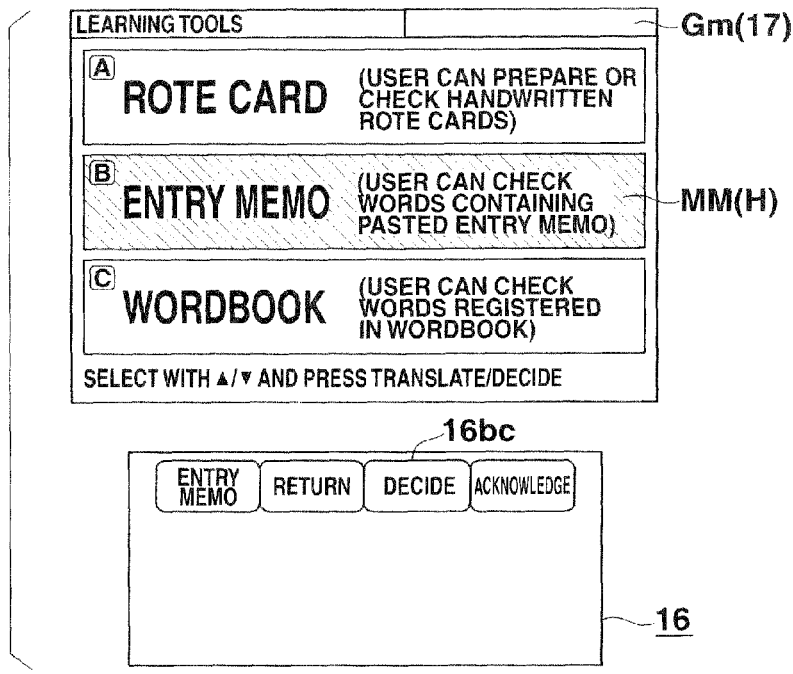
FIGS. 12A to 12E show display operation 1 to display operation 5 according to a user operation in the entry memo calling process of the third embodiment in the electronic dictionary device 10 with the handwriting input function.
Figure 12B:
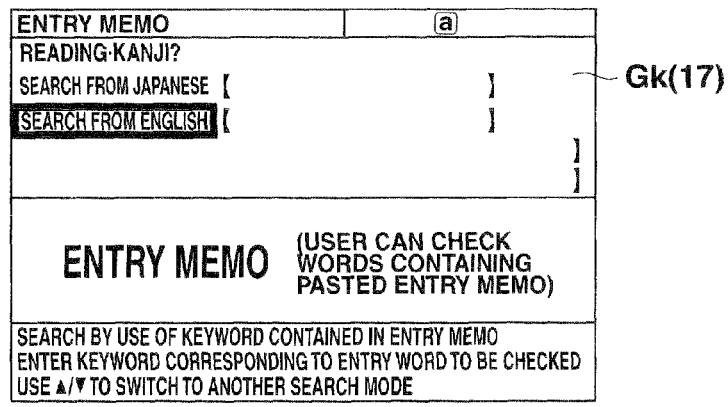

In a state where a learning-function menu screen Gm is displayed on the display unit 17 and "Entry memo" MM on the menu screen Gm is selected and shown in a highlighted manner H according to the input of the cursor key 14*d* as shown in FIG. 12A, when the entry memo calling mode is set by the input of "Translate/Decide" key 14*c* (YES in step D1), a keyword input screen Gk for retrieving the desired entry memo data item on the basis of a keyword is displayed on the display unit 17 as shown in FIG. 12B (step D2).

Figure 12C:
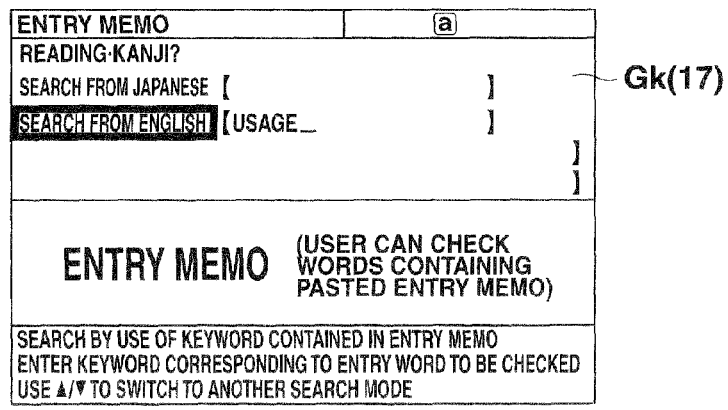

With the keyword input screen Gk, in a case where the user wants to refer to an entry memo data item including, for example, the word "usage," when the keyword "usage" is input according to the input of character input key 14*a* as shown in FIG. 12C and "Translate/Decide" key 14*c* is input (YES in step D3), entry memo data items 27*a* to 27*d* including the handwritten characters "usage" caused to correspond to corresponding keyword information items 27*ak* to 27*dk* for the input keyword "usage" are read from the entry memo data items registered in the RAM 23 and displayed in list form on the display unit 17 (step D4).

With the entry memo data items 27*a* to 27*d* including the keyword "usage" being displayed in list form, when the user-desired entry memo data item "Special usage of HELP" 27*a* is selected and shown in a highlighted manner according to the input of cursor key 14*d* and "Translate/Decide" key 14 is input (YES in step D5), corresponding entry word information items "help• er" 27*am*1 to "help3" 27*am*5 caused to correspond to the selected entry memo data item 27*a* and registered are read and displayed on the display unit 17 as a corresponding entry word list screen Gs (step D6).

Figure 12D:
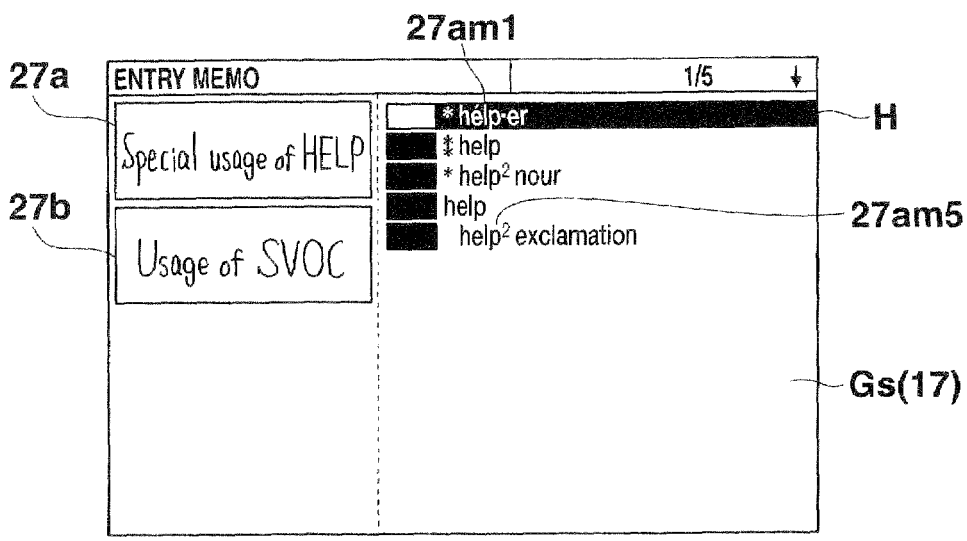
Figure 12E:
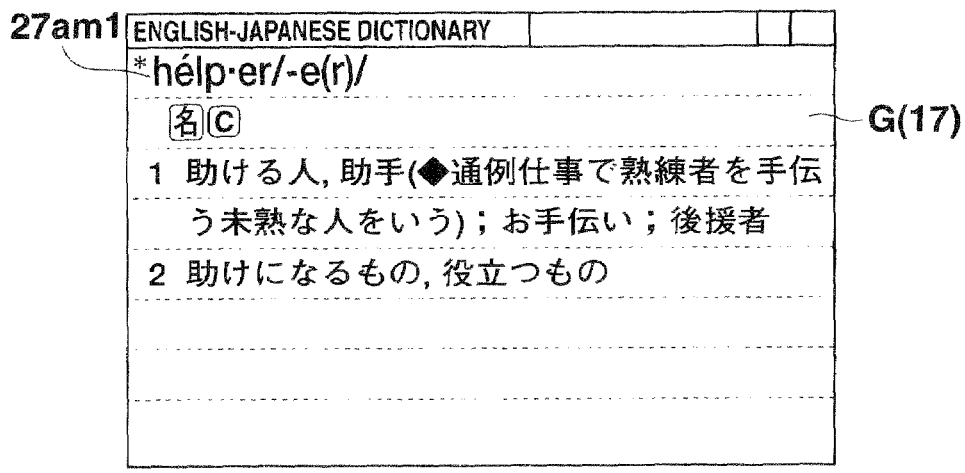

With the corresponding entry word list screen Gs for the user-desired entry memo data item 27*a*, when one entry word "help• er" 27*am*1 is selected and shown in a highlighted manner H according to the input of cursor key 14*d* as shown in FIG. 12D and "Translate/Decide" key 14*c* is input (YES in step D7), explanatory information corresponding to the selected entry word "help• er" 27*am*1 is read from dictionary data items 26*a*, 26*b*, . . . and is displayed full-screen on the display unit 17 as the explanatory information display screen G as shown in FIG. 12E (step D8).

By carrying out the entry memo calling process of the third embodiment, the user can retrieve entry memo data item 27*a* including the desired keyword quickly from many handwritten character entry memo data items 27*a*, 27*b*, . . . equivalent to, for example, many sticky notes and read out and look at an entry word corresponding to the contents and its explanatory information easily.

Accordingly, with the entry memo registering and calling function of the third embodiment in the electronic dictionary device 10 with the handwriting input function configured as described above, when entry memo data item "Special usage of HELP" 27*a* is input in handwritten characters at the handwriting input unit 16*a* in a state where the entry word "help• er" retrieved from the dictionary and its explanatory information have been displayed, the entry memo data item 27a is caused to correspond to not only the keywords "HELP," "Special," and "Usage" extracted from the handwritten characters but also the entry word "help• er" retrieved from the dictionary and the resulting data item is registered. Then, when the registered entry memo data items 27a to 27d including the characters "Usage" are displayed quickly in list form by inputting the keyword "Usage" in characters and the desired entry memo data item "Special usage of HELP" 27a is selected, the entry word "help• er" caused to correspond to the entry memo data item 27a and its explanatory information are displayed immediately. This enables the desired entry memo data item to be retrieved quickly by inputting a keyword (27ak) in characters even when entry memo data items 27a, 27b, . . . equivalent to, for example, many sticky notes have been registered, thereby making it possible to easily display an entry word related to the entry memo data item and its explanatory information.

According to the present invention, it is possible to provide an electronic device capable of storing handwritten characters in such a manner that they are related to an arbitrary entry word and of retrieving the related entry word easily on the basis of the handwritten characters.

It is to be understood that the present invention is not limited to the specific embodiments described above and that the invention can be embodied with the components modified without departing from the spirit and scope of the invention. The invention can be embodied in various forms according to the appropriate combinations of the components disclosed in the embodiments described above. For example, some components may be deleted from all components shown in the embodiments. Further, the components in different embodiments may be used appropriately in combination.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic device comprising:
    a dictionary data storage means which stores a plurality of entry words and explanatory information on each of said plurality of entry words in such a manner that the former corresponds to the latter in a one-to-one correspondence;
    a dictionary information display control means which causes an arbitrary entry word and explanatory information corresponding to the entry word stored in the dictionary data storage means to be displayed on a display unit according to a user operation;
    a handwriting input accepting means which accepts a handwriting input corresponding to a user operation with a handwriting input unit in a state where the dictionary information display control means has displayed an arbitrary entry word and explanatory information corresponding to the entry word on the display unit;
    an entry memo storage means which causes the handwriting input information accepted by the handwriting input accepting means to correspond to the entry word displayed by the dictionary information display control means and stores the resulting information as an entry memo;
    an entry memo display control means which displays in list form the entry memos stored in the entry memo storage means on the display unit;
    an entry-word list display control means which reads out entry words from the entry memo storage means, the entry words corresponding to an entry memo selected from an entry memo list displayed in the entry memo display control means by a user operation, and displays the entry words in list form; and
    an entry-memo corresponding entry word display control means which reads out an entry word selected from a list displayed by the entry-word list display control means by a user operation and explanatory information of the entry word from the dictionary data storage means, and displays the entry word and explanatory information on the display unit.

2. The electronic device according to claim 1, further comprising:
    a keyword storage means which stores a plurality of keywords;
    a keyword determining means which determines whether the keywords stored in the keyword storage means are included in the handwriting input information accepted by the handwriting input accepting means; and
    a character input means which inputs characters;
    wherein the entry memo storage means includes a corresponding keyword entry memo storage means which, when the keyword determining means has determined that the keywords are included in the handwriting input information, causes the handwriting input information to correspond to the entry word displayed by the dictionary information display control means and its keyword and stores the resulting information as an entry memo, and
    wherein the entry memo display control means displays in list form an entry memo stored in the entry memo storage means in such a manner that the entry memo corresponds to a keyword coinciding with character information input by the character input means.

3. An electronic device comprising:
    a dictionary data storage means which stores a plurality of entry words and explanatory information on each of said plurality of entry words in such a manner that the former corresponds to the latter in a one-to-one correspondence;
    a dictionary information display control means which causes an arbitrary entry word and explanatory information corresponding to the entry word stored in the dictionary data storage means to be displayed on a display unit according to a user operation;
    a handwriting input accepting means which accepts a handwriting input corresponding to a user operation with a handwriting input unit in a state where the dictionary information display control means has displayed an arbitrary entry word and explanatory information corresponding to the entry word on the display unit;
    an entry memo storage means which causes the handwriting input information accepted by the handwriting input accepting means to correspond to the entry word displayed by the dictionary information display control means and stores the resulting information as an entry memo;
    an entry memo display control means which displays in list form the entry memos stored in the entry memo storage means on the display unit;
    an entry-memo corresponding entry word display control means which, based on an entry word stored in the entry memo storage means such that the entry word corresponds to an entry memo selected by a user operation from the entry memos displayed in list form by the entry memo display control means, reads the entry word and its explanatory information from said plurality of entry words and their explanatory information stored by the dictionary data storage means, and displays the entry word and explanatory information;

a keyword storage means which stores a plurality of keywords;

a keyword determining means which determines whether the keywords stored in the keyword storage means are included in the handwriting input information accepted by the handwriting input accepting means; and a character input means which inputs characters;

wherein the entry memo storage means includes corresponding keyword entry memo storage means which, when the keyword determining means has determined that the keywords are included in the handwriting input information, causes the handwriting input information to correspond to the entry word displayed by the dictionary information display control means and its keyword and stores the resulting information as an entry memo, and wherein the entry memo display control means displays in list form an entry memo stored in the entry memo storage means in such a manner that the entry memo corresponds to a keyword coinciding with character information input by the character input means.

4. A non-transitory computer readable storage medium having a program stored thereon for controlling a computer to function as:

a dictionary data storage means which stores a plurality of entry words and explanatory information on each of said plurality of entry words in such a manner that the former corresponds to the latter in a one-to-one correspondence;

a dictionary information display control means which causes an arbitrary entry word and explanatory information corresponding to the entry word stored in the dictionary data storage means to be displayed on a display unit according to a user operation;

a handwriting input accepting means which accepts a handwriting input corresponding to a user operation with a handwriting input unit in a state where the dictionary information display control means has displayed an arbitrary entry word and explanatory information corresponding to the entry word on the display unit;

an entry memo storage means which causes the handwriting input information accepted by the handwriting input accepting means to correspond to the entry word displayed by the dictionary information display control means and stores the resulting information as an entry memo;

an entry memo display control means which displays in list form the entry memos stored in the entry memo storage means on the display unit;

an entry-word list display control means which reads out entry words from the entry memo storage means, the entry words corresponding to an entry memo selected from an entry memo list displayed in the entry memo display control means by a user operation and displays the entry words in list form; and an entry-memo corresponding entry word display control means which reads out an entry word selected from a list displayed in the entry-word list display control means by a user operation and explanatory information of the entry word from the dictionary data storage means, and displays the entry word and explanatory information on the display unit.

5. The storage medium according to claim 4, further controlling the computer to function as:

a keyword storage means which stores a plurality of keywords;

a keyword determining means which determines whether the keywords stored in the keyword storage means are included in the handwriting input information accepted by the handwriting input accepting means; and a character input means which inputs characters wherein the entry memo storage means includes a corresponding keyword entry memo storage means which, when the keyword determining means has determined that the keywords are included in the handwriting input information, causes the handwriting input information to correspond to the entry word displayed by the dictionary information display control means and its keyword and stores the resulting information as an entry memo, and wherein the entry memo display control means displays in list form an entry memo stored in the entry memo storage means in such a manner that the entry memo corresponds to a keyword coinciding with character information input by the character input means.

6. A non-transitory computer readable storage medium having a program stored thereon for controlling a computer to function as:

a dictionary data storage means which stores a plurality of entry words and explanatory information on each of said plurality of entry words in such a manner that the former corresponds to the latter in a one-to-one correspondence;

a dictionary information display control means which causes an arbitrary entry word and explanatory information corresponding to the entry word stored in the dictionary data storage means to be displayed on a display unit according to a user operation;

a handwriting input accepting means which accepts a handwriting input corresponding to a user operation with a handwriting input unit in a state where the dictionary information display control means has displayed an arbitrary entry word and explanatory information corresponding to the entry word on the display unit;

an entry memo storage means which causes the handwriting input information accepted by the handwriting input accepting means to correspond to the entry word displayed by the dictionary information display control means and stores the resulting information as an entry memo;

an entry memo display control means which displays in list form the entry memos stored in the entry memo storage means on the display unit;

an entry-memo corresponding entry word display control means which, based on an entry word stored in the entry memo storage means such that the entry word corresponds to an entry memo selected by a user operation from the entry memos displayed in list form by the entry memo display control means, reads the entry word and its explanatory information from said plurality of entry words and their explanatory information stored by the dictionary data storage means, and displays the entry word and explanatory information;

a keyword storage means which stores a plurality of keywords;

a keyword determining means which determines whether the keywords stored in the keyword storage means are included in the handwriting input information accepted by the handwriting input accepting means; and a character input means which inputs characters wherein the entry memo storage means includes corresponding keyword entry memo storage means which, when the keyword determining means has determined that the keywords are included in the handwriting input information, causes the handwriting input information to correspond to the entry word displayed by the dictionary information display control means and its keyword and stores the resulting information as an entry memo, and wherein the entry memo display control means displays in list form an entry memo stored in the entry memo storage means in such a manner that the entry memo corresponds to a keyword coinciding with character information input by the character input means.

7. An electronic device comprising:

a display unit;

a handwriting input unit which accepts a handwriting input according to a user operation;

a storage unit which stores a plurality of entry words and explanatory information on each of said plurality of entry words in such a manner that the former corresponds to the latter in a one-to-one correspondence; and a control unit which:

causes an arbitrary entry word and explanatory information corresponding to the entry word stored in the storage unit to be displayed on the display unit according to a user operation, accepts a handwriting input corresponding to a user operation with the handwriting input unit in a state where an arbitrary entry word and explanatory information corresponding to the entry word have been displayed on the display unit, causes the handwriting input information accepted by the handwriting input unit to correspond to the entry word displayed on the display unit and stores the resulting information as an entry memo into the storage unit, displays in list form the entry memos stored in the storage unit on the display unit, reads out entry words from the storage unit, the entry words corresponding to an entry memo selected from the entry memos displayed in list form by a user operation and displays the entry words in list form, and reads out an entry word selected from the entry words in list form by a user operation and explanatory information of the entry word from a plurality of entry words and explanatory information thereof stored in the storage means, and displays the entry word and explanatory information on the display unit.

8. The electronic device according to claim 7, further comprising a character input unit which inputs characters;

wherein the storage unit further stores a plurality of keywords, and wherein the control unit:

determines whether the keywords stored in the storage unit are included in the handwriting input information, and, when it has been determined that the keywords are included in the handwriting input information, causes the handwriting input information to correspond to the entry word displayed on the display unit and its keyword and stores the resulting information as an entry memo, and displays in list form an entry memo stored in the storage unit in such a manner that the entry memo corresponds to a keyword coinciding with character information input by the character input unit.

9. An electronic device comprising:

a display unit;

a handwriting input unit which accepts a handwriting input according to a user operation;

a storage unit which stores a plurality of entry words and explanatory information on each of said plurality of entry words in such a manner that the former corresponds to the latter in a one-to-one correspondence;

a control unit which:

causes an arbitrary entry word and explanatory information corresponding to the entry word stored in the storage unit to be displayed on the display unit according to a user operation, accepts a handwriting input corresponding to a user operation with the handwriting input unit in a state where an arbitrary entry word and explanatory information corresponding to the entry word have been displayed on the display unit, causes the handwriting input information accepted by the handwriting input unit to correspond to the entry word displayed on the display unit and stores the resulting information as an entry memo into the storage unit, displays in list form the entry memos stored in the storage unit on the display unit, reads out entry words from the storage unit, the entry words corresponding to an entry memo selected from the entry memos displayed in list form by a user operation and displays the entry words in list form, and reads out an entry word selected from the entry words in list form by a user operation and explanatory information of the entry word from a plurality of entry words and explanatory information thereof stored in the storage means, and displays the entry word and explanatory information on the display unit; and a character input unit which inputs characters;

wherein the storage unit further stores a plurality of keywords, and wherein the control unit further:

determines whether the keywords stored in the storage unit are included in the handwriting input information, and, when it has been determined that the keywords are included in the handwriting input information, causes the handwriting input information to correspond to the entry word displayed on the display unit and its keyword and stores the resulting information as an entry memo, and displays in list form an entry memo stored in the storage unit in such a manner that the entry memo corresponds to a keyword coinciding with character information input by the character input unit.

* * * * *